US008807100B2

(12) United States Patent
Kamiyama

(10) Patent No.: US 8,807,100 B2
(45) Date of Patent: Aug. 19, 2014

(54) ENGINE

(75) Inventor: Eiichi Kamiyama, Mishima (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/881,286

(22) PCT Filed: Nov. 8, 2010

(86) PCT No.: PCT/JP2010/069859
§ 371 (c)(1),
(2), (4) Date: Apr. 24, 2013

(87) PCT Pub. No.: WO2012/063313
PCT Pub. Date: May 18, 2012

(65) Prior Publication Data
US 2013/0213035 A1  Aug. 22, 2013

(51) Int. Cl.
*F01L 1/34* (2006.01)
(52) U.S. Cl.
USPC .......... 123/90.15; 123/90.17; 123/559.1; 60/598
(58) Field of Classification Search
USPC .............. 123/90.15, 90.17, 559.1; 60/598
See application file for complete search history.

(56) References Cited

U.S. PATENT DOCUMENTS

| 6,460,337 B1 | 10/2002 | Olofsson | |
| 7,444,965 B2 * | 11/2008 | Frehland | 123/90.15 |
| 2009/0043479 A1 | 2/2009 | Noda et al. | |
| 2010/0108004 A1 | 5/2010 | Lettmann et al. | |
| 2010/0242472 A1 | 9/2010 | Elsasser et al. | |
| 2011/0041810 A1 | 2/2011 | Nakasaka | |

FOREIGN PATENT DOCUMENTS

| DE | 102007042053 A1 | 3/2009 |
| JP | 3-31534 A | 2/1991 |
| JP | 5-321804 A | 12/1993 |
| JP | 2004-183510 A | 7/2004 |
| JP | 2008-128227 A | 6/2008 |
| JP | 2009-57958 A | 3/2009 |
| JP | 2009-74366 A | 4/2009 |
| JP | 2009-115035 A | 5/2009 |
| JP | 2009-144521 A | 7/2009 |
| JP | 2010-502884 A | 1/2010 |

OTHER PUBLICATIONS

Extended European Search Report issued Feb. 26, 2014 in European Patent Application No. 10859561.2.

\* cited by examiner

*Primary Examiner* — Ching Chang
(74) *Attorney, Agent, or Firm* — Sughrue Mion, PLLC

(57) ABSTRACT

An engine is equipped with a supercharger (exhaust turbocharger) which is rotationally driven by means of exhaust gas and in which an expansion ratio is settable greater than a compression ratio. The engine includes: an operation state determination unit that determines an operation state of the engine; a plurality of exhaust valves provided at a single cylinder; a variable exhaust valve timing mechanism that is capable of changing opening timing of at least one exhaust valve among the exhaust valves; and a controller that, when it is determined by the operation state determination unit that the engine is operated with low load and is acceleration time, transmits a command to the variable exhaust valve timing mechanism and advances the opening timing of the at least one exhaust valve relative to the opening timing of another exhaust valve. Thereby, supercharging response and the expansion ratio are maintained.

9 Claims, 23 Drawing Sheets

ENGINE

CROSS REFERENCE TO RELATED APPLICATIONS

This application is a National Stage of International Application No. PCT/JP2010/0698596, filed on Nov. 8, 2010, the contents of all of which are incorporated herein by reference in their entirety.

TECHNICAL FIELD

The present invention is related to an engine, and more particularly, to a high expansion ratio engine equipped with a supercharger which is rotationally driven by means of exhaust gas and in which an expansion ratio can be set greater than a compression ratio.

BACKGROUND ART

Conventionally, there has been known a high expansion ratio cycle engine equipped with a supercharger in which an expansion ratio is set greater than a compression ratio. Such a high expansion ratio cycle engine can be equipped with a variable valve timing mechanism capable of changing opening timing of an exhaust valve. Then, when it is determined that the high expansion ratio cycle engine is operated at a low and/or middle speed range and a low load range, and becomes transient timing of acceleration, the high expansion ratio engine activates the variable valve timing mechanism so as to advance the opening timing of the exhaust valve, thereby preventing degradation of the response of the supercharger (see Patent Document 1).

PRIOR ART DOCUMENT

Patent Document

[Patent Document 1] Japanese Patent Application Publication No. 2004-183510

SUMMARY OF THE INVENTION

Problems to be Solved by the Invention

However, when the opening timing of the exhaust valve is advanced, an supercharging response is maintainable, but the expansion ratio decreases. Therefore, the advantage of the high expansion ratio may be abandoned depending on circumstances. Abandonment of the advantage of the high expansion ratio affects fuel consumption performance.

Therefore, the high expansion ratio engine described herein is directed to maintenance or improvement of the supercharging response of the supercharger in addition to maintenance of the fuel consumption performance by the maintenance of the high expansion ratio.

Means for Solving the Problems

To solve the above problem, a high expansion ratio engine disclosed in the present description is characterized by an engine equipped with a supercharger which is rotationally driven by means of exhaust gas and in which an expansion ratio is settable greater than a compression ratio, the engine including: an operation state determination unit that determines an operation state of the engine; a plurality of exhaust valves provided at a single cylinder; a variable exhaust valve timing mechanism that is capable of changing opening timing of at least one exhaust valve among the exhaust valves; and a controller that, when it is determined by the operation state determination unit that the engine is operated with low load and is acceleration time, transmits a command to the variable exhaust valve timing mechanism and advances the opening timing of the at least one exhaust valve relative to the opening timing of another exhaust valve.

The opening timing of the at least one exhaust valve is advanced with the variable exhaust valve timing mechanism, so that exhaust gas having a high exhaust pressure and a high exhaust temperature can be supplied to the supercharger from an exhaust valve opened early. Thereby, supercharging response of the supercharger can be maintained. On the other hand, by the another exhaust valve, i.e., another exhaust valves other than the advanced exhaust valve, the expansion ratio can be maintained and the fuel consumption performance can be secured.

Such a high expansion ratio engine further includes: a variable compression ratio mechanism capable of changing a mechanical compression ratio; and a variable intake valve timing mechanism capable of changing closing timing of an intake valve; wherein the controller can control an actual compression ratio with the use of the variable compression ratio mechanism and the variable intake valve timing mechanism.

The engine includes the variable compression ratio mechanism and the variable intake valve timing mechanism, so that improvement in the fuel consumption at the time of low load and output acquisition at the time of high load are attained.

Moreover, the controller of the high expansion ratio engine disclosed in the present description can control an advance amount of the opening timing of the at least one exhaust valve so that the smaller a target intake air amount, the larger the advance amount of the opening timing of the at least one exhaust valve.

When there is few intake air amount into a cylinder, the energy of fuel gas which expands in the cylinder is small, and the exhaust energy used for the drive of the supercharger becomes small. Therefore, the purpose of the above-mentioned control is to increase the advance amount of the exhaust valve, secure the total amount of the exhaust energy used for the drive of the supercharger, and maintain the supercharging response of the supercharger.

The controller included in the high expansion ratio engine disclosed in the present description can control an advance amount of the opening timing of the at least one exhaust valve so that the smaller the expansion ratio, the smaller the advance amount of the opening timing of the at least one exhaust valve.

When the opening timing of the exhaust valve is advanced, the expansion ratio is made smaller and the fuel consumption performance is affected. Therefore, the purpose of the above-mentioned control is that, when the expansion ratio is small, the advance amount of the opening timing of the exhaust valve is made small so that expansion ratio is maintained, and the fuel consumption performance is maintained.

When it is determined by the operation state determination unit that the engine is the acceleration time in a state where the closing timing of the intake valve has been changed into a side in which the compression ratio is reduced, with the variable intake valve timing mechanism, the controller can change the closing timing of the intake valve in a direction in which the compression ratio is improved, with the variable intake valve timing mechanism.

The purpose of the above-mentioned control is to increase the intake air amount to be stored in the cylinder, supply the stored air to the supercharger, and further improve the response of the supercharger when it is determined that the engine is the acceleration time. Here, in order to reduce the compression ratio, the closing timing of the intake valve can be advanced or retarded. When a state where the compression ratio is reduced is made by closing the intake valve early, the compression ratio is raised by retarding the closing timing of the intake valve. On the contrary, when the state where the compression ratio is reduced is made by closing the intake valve late, the compression ratio is raised by advancing the closing timing of the intake valve.

When it is determined by the operation state determination unit that acceleration request of the engine has reduced, the controller can retard the opening timing of the at least one exhaust valve in which the opening timing has been advanced.

When the acceleration request of the engine has reduced, the work load required for the supercharger also reduces. Therefore, the purpose of the above-mentioned control is to give weight to the fuel efficiency and improve the expansion ratio again, in such a situation.

When it is determined by the operation state determination unit that acceleration request of the engine has reduced in a state where the closing timing of the intake valve has been changed into a side in which the compression ratio is reduced, with the variable intake valve timing mechanism, the controller can change the closing timing of the intake valve in a direction in which the compression ratio is reduced, with the variable intake valve timing mechanism.

This is a measure in the case where the acceleration request of the engine has reduced, in a state where it is determined that the engine is the acceleration time as described above and the closing timing of the intake valve is controlled to increase the intake air amount to be stored in the cylinder. The purpose of the above-mentioned control is to improve the expansion ratio again and the fuel consumption.

The high expansion ratio engine disclosed in the present description is equipped with a supercharger which is rotationally driven by means of exhaust gas and in which an expansion ratio is settable greater than a compression ratio, the engine including: an operation state determination unit that determines an operation state of the engine; a plurality of exhaust valves provided at a single cylinder; a variable exhaust valve timing mechanism that is capable of changing opening timing of at least one exhaust valve among the exhaust valves; and a controller that, when it is determined by the operation state determination unit that the engine is operated with a load equal to or more than a middle load and is in a steady supercharging operation state in which supercharging is performed by the supercharger, transmits a command to the variable exhaust valve timing mechanism and retards the opening timing of the at least one exhaust valve relative to the opening timing of another exhaust valve, compared with non-supercharging time of the supercharger.

In the supercharging time, the intake air amount in the cylinder becomes large, compared with the non-supercharging time. Therefore, even when the opening timing of the exhaust valve is retarded, an influence which it has on the supercharging response of the supercharger is small. Accordingly, the purpose of the above-mentioned control is to improve the expansion ratio for the purpose of the improvement in the fuel consumption. That is, the purpose of the above-mentioned control is directed to both of the improvement in the expansion ratio and the maintenance in the supercharging response.

Such a high expansion ratio engine further includes: a variable compression ratio mechanism capable of changing a mechanical compression ratio; and a variable intake valve timing mechanism capable of changing closing timing of an intake valve; wherein the controller can control an actual compression ratio with the use of the variable compression ratio mechanism and the variable intake valve timing mechanism.

The engine includes the variable compression ratio mechanism and the variable intake valve timing mechanism, so that improvement in the fuel consumption at the time of low load and output acquisition at the time of high load are attained.

The controller in the high expansion ratio engine disclosed in the present description can control an advance amount of the opening timing of the at least one exhaust valve so that the smaller the intake air amount, the larger the advance amount of the opening timing of the at least one exhaust valve.

When there is few intake air amount and the air in the cylinder is expanded, the exhaust energy which is sent to the supercharger becomes small. Therefore, the purpose of the above-mentioned control is to advance the opening timing of the exhaust valve and improve the supercharging response.

Effects of the Invention

According to the engine described herein, it is possible to maintain the supercharging response of the supercharger and maintain the fuel consumption performance by the maintenance of the high expansion ratio.

MODES FOR CARRYING OUT THE INVENTION

Hereinafter, a description will be given of an embodiment of the present invention with reference to the drawings. It should be noted that a size and ratio of each portion do not correspond to the actual ones in some drawings. Also, a detail illustration is omitted in some drawings.

First Embodiment

Figure 1:
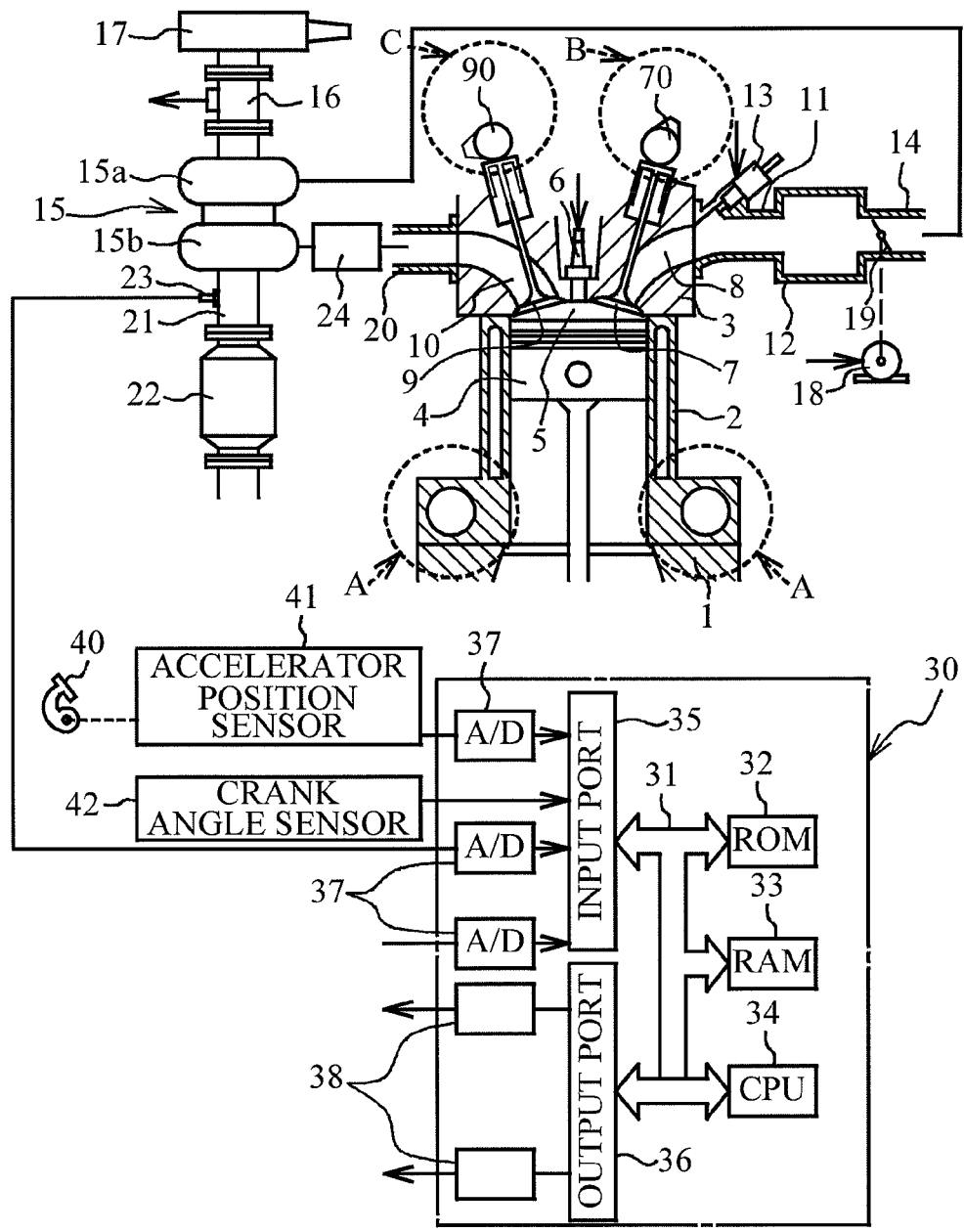
FIG. 1 is an explanatory diagram illustrating the schematic configuration of an engine according to an embodiment.

FIG. 1 is a sectional side view of an engine 100 according to the present embodiment. The engine 100 is a spark ignition engine with four cylinders. The engine 100 is a high expansion ratio engine in which an expansion ratio can be set greater than a compression ratio, as described in detail later. Further, the engine 100 is equipped with an exhaust turbocharger 15 that is an example of a supercharger which is rotationally driven by means of exhaust gas.

As illustrated in FIG. 1, the engine 100 is equipped with a crankcase 1, a cylinder block 2, a cylinder head 3, and pistons 4. Also, the engine 100 is equipped with combustion chambers 5, spark plugs 6 arranged at the centers of the tops of the combustion chambers 5, intake valves 7, and intake ports 8. Moreover, the engine 100 is equipped with exhaust valves 9 and exhaust ports 10. Each intake port 8 is connected through an intake branch pipe 11 to a surge tank 12. Each intake branch pipe 11 is provided with a fuel injector 13 to inject fuel toward the inside of the corresponding intake port 8. It should be noted that the fuel injector 13 may be arranged to face the inside of each combustion chamber 5 instead of attaching to each intake air branch pipe 11. Here, a plurality of exhaust valves 9 can be provided at a single cylinder. In the present embodiment, two exhaust valves 9 is provided at the single cylinder.

The surge tank 12 is connected through an intake duct 14 to an outlet of a compressor 15a of an exhaust turbocharger 15. The inlet of the compressor 15a is connected through an intake air detector 16 using e.g. a hot wire, to an air cleaner 17. Inside the intake duct 14, a throttle valve 19 which is driven by an actuator 18 is arranged. The exhaust turbocharger 15 is an example of a supercharger which is rotationally driven by means of exhaust gas. The intake air detector 16 is an example of an intake air amount acquiring unit.

On the other hand, each exhaust port 10 is connected through an exhaust manifold 20 to an inlet of an exhaust turbine 15b of the exhaust turbocharger 15. An outlet of the exhaust turbine 15b is connected through an exhaust pipe 21 to a catalytic converter 22 housing e.g. a three-way catalyst. Inside the exhaust pipe 21, an air-fuel ratio sensor 23 is arranged. In vicinity of the exhaust turbine 15b of the exhaust turbocharger 15, a wastegate valve 24 is provided. The wastegate valve 24 can acquire information on the opening degree thereof, and transmits the information to an electronic control unit 30 described later.

The engine 100 is equipped with a variable compression ratio mechanism A, as illustrated in FIG. 1. The variable compression ratio mechanism A is provided on a connection unit between the crankcase 1 and the cylinder block 2. Then, by changing the relative position of the crankcase 1 and the cylinder block 2 in a direction of a cylinder shaft line, the variable compression ratio mechanism A can change the volume of the combustion chamber 5 (i.e., a mechanical compression ratio) in the case where the piston 4 is located at a compression top dead center.

Also, the engine 100 is equipped with a variable intake valve timing mechanism B that can change the closing timing of the intake valve 7 in order to change start timing of actual compression operation.

Moreover, the engine 100 is equipped with a variable exhaust valve timing mechanism C that can change the opening timing of at least one exhaust valve 9.

The engine 100 is equipped with the electronic control unit 30. The electronic control unit 30 corresponds to a control unit, and includes a function of an operation state determination unit that determines an operation state of the engine.

When it is determined that the engine 100 is operated with low load and is acceleration time, the electronic control unit 30 outputs a command to the variable exhaust valve timing mechanism C to advance the opening timing of one exhaust valve relative to the opening timing of another exhaust valve, as described in detail later.

The electronic control unit 30 is composed of a digital computer. The electronic control unit 30 is provided with components connected with each other by a bidirectional bus 31 such as a ROM (read only memory) 32, a RAM (random access memory) 33, a CPU (microprocessor) 34, an input port 35, and an output port 36. An output signal of the intake air detector 16 and an output signal of the air-fuel ratio sensor 23 are input to the input port 35 through respectively corresponding AD converters 37. An accelerator position sensor 41 that generates an output voltage proportional to an amount L of depression of the accelerator pedal 40 is connected to the accelerator pedal 40. The output voltage of the accelerator position sensor 41 is input to the input port 35 through a corresponding AD converter 37. Furthermore, a crank angle sensor 42 that generates an output pulse whenever a crankshaft rotates, for example, 30 degrees is connected to the input port 35. On the other hand, the output port 36 is connected to the spark plugs 6, the fuel injector 13, the throttle valve drive-use actuator 18, the variable compression ratio mechanism A, the variable intake valve timing mechanism B, and the variable exhaust valve timing mechanism C through corresponding drive circuits 38.

Figure 2:
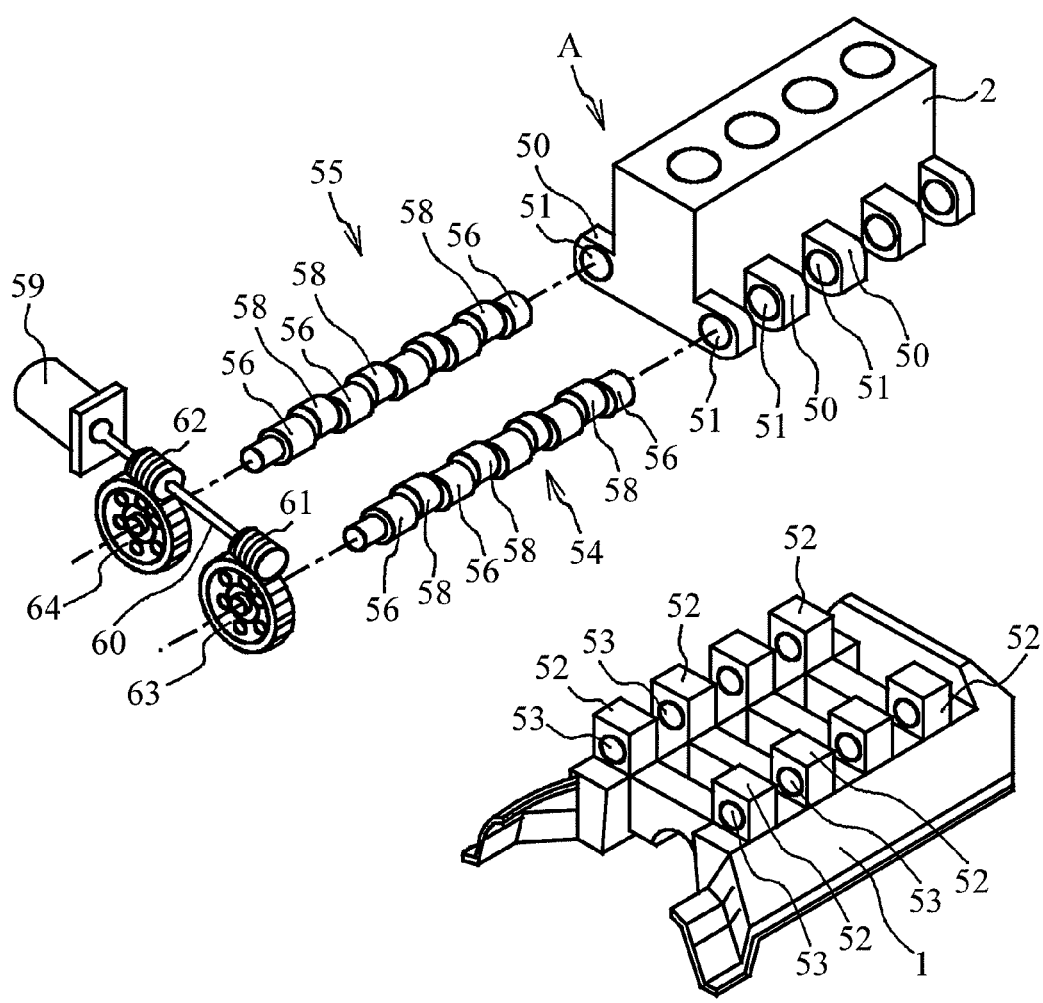
FIG. 2 is an exploded perspective view of a variable compression ratio mechanism with which the engine of the embodiment is equipped.
Figure 3A:
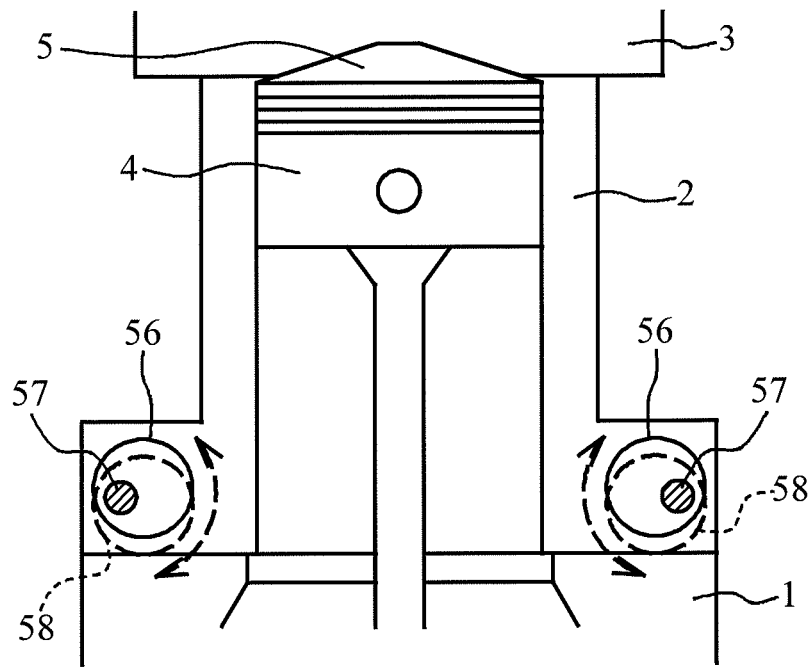
FIGS. 3A and 3B are explanatory diagrams schematically illustrating a cross-section surface of the engine according to the embodiment.
Figure 3B:
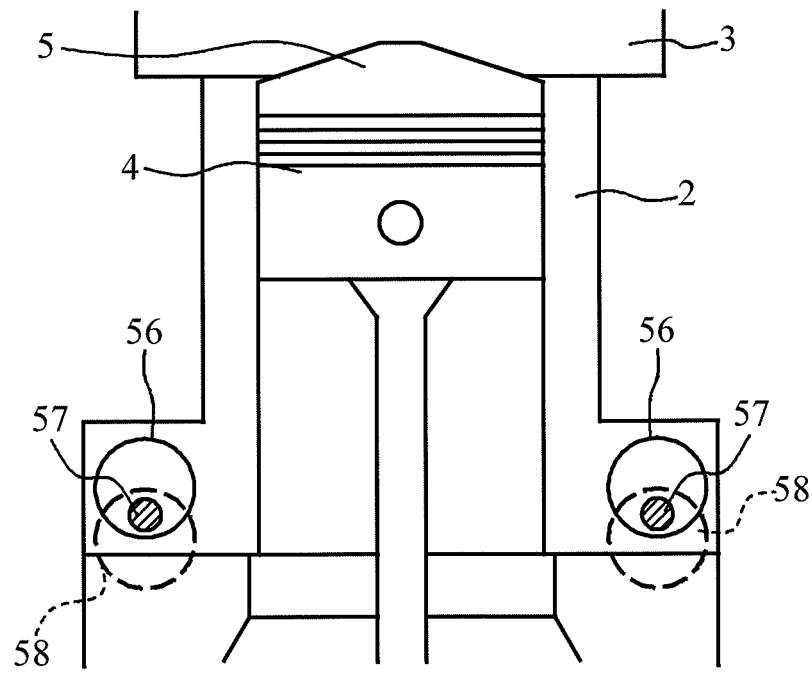

FIG. 2 is an exploded perspective view of the variable compression ratio mechanism A with which the engine 100 illustrated in FIG. 1 is equipped. FIGS. 3A and 3B are explanatory diagrams schematically illustrating a cross-section surface of the engine 100. As illustrated in FIG. 2, a plurality of projecting portions 50 that are spaced mutually are formed at the lower parts of both-sides walls of the cylinder block 2. In each projecting portion 50, the cam insertion hole 51 having a round shape in cross section is formed. On the other hand, on the upper surface of a wall of the crankcase 1, a plurality of projecting portions 52 that are spaced mutually and are fit between the corresponding projecting portions 50, respectively, are formed. In each projecting portion 52, the cam insertion hole 53 having a round shape in cross section is formed.

As illustrated in FIG. 2, a pair of camshafts 54 and 55 are provided. On each of the camshafts 54 and 55, a circular cam 56 alternately inserted rotatably into each cam insertion hole 51 is fixed. The circular cams 56 have the same axis as the rotational axis line of each of the camshaft 54 and 55. On the other hand, between the respective circular cam 56, an eccentric shaft 57 eccentrically arranged with respect to the rotational axis line of each of the camshaft 54 and 55 as illustrated in hatching of FIG. 3 is prolonged. On the eccentric shaft 57, another circular cams 58 are decentered and attached rotatably. As illustrated in FIG. 2, each circular cam 58 is arranged between respective circular cams 56, and is rotatably inserted into the corresponding cam insertion hole 53.

When the circular cams 56 fixed on the respective camshafts 54 and 55 are rotated along arrows of dashed lines in FIG. 3A from a state as illustrated in FIG. 3A, the eccentric shafts 57 move towards the middle of the bottom. Thereby, the circular cams 58 rotate in the cam insertion holes 53, and when the eccentric shafts 57 move towards the middle of the bottom as illustrated in FIG. 3B, the centers of the circular cams 58 move below the eccentric shafts 57.

As is clear from comparison between FIGS. 3A and 3B, the relative position of the crankcase 1 and the cylinder block 2 is decided by a distance between the centers of the circular cam 56 and the circular cam 58. As the distance between the centers of the circular cam 56 and the circular cam 58 becomes large, the cylinder block 2 separates from the crankcase 1. When the cylinder block 2 separates from the crankcase 1, the volume of the combustion chamber 5 in the case where the piston 4 is located at the compression top dead center increases. Therefore, the rotation of each of the camshafts 54 and 55 can change the volume of the combustion chamber 5 in the case where the piston 4 is located at the compression top dead center. This makes it possible to change the mechanical compression ratio.

In order to rotate the camshafts 54 and 55 mutually in opposite directions, a pair of worm gears 61 and 62 in which spiral directions are opposite mutually are attached to a rotation shaft of a driving motor 59, as illustrated in FIG. 2. Gears 63 and 64 which engage with the worm gears 61 and 62 are fixed to the ends of the camshafts 54 and 55, respectively. In the present embodiment, the driving of the driving motor 59 can widely change the volume of the combustion chamber 5 in the case where the piston 4 is located at the compression top dead center. It should be noted that the variable compression ratio mechanism A illustrated in FIGS. 1 to 3B indicates an example of the variable compression ratio mechanism, and any types of variable compression ratio mechanism can be used.

Figure 4:
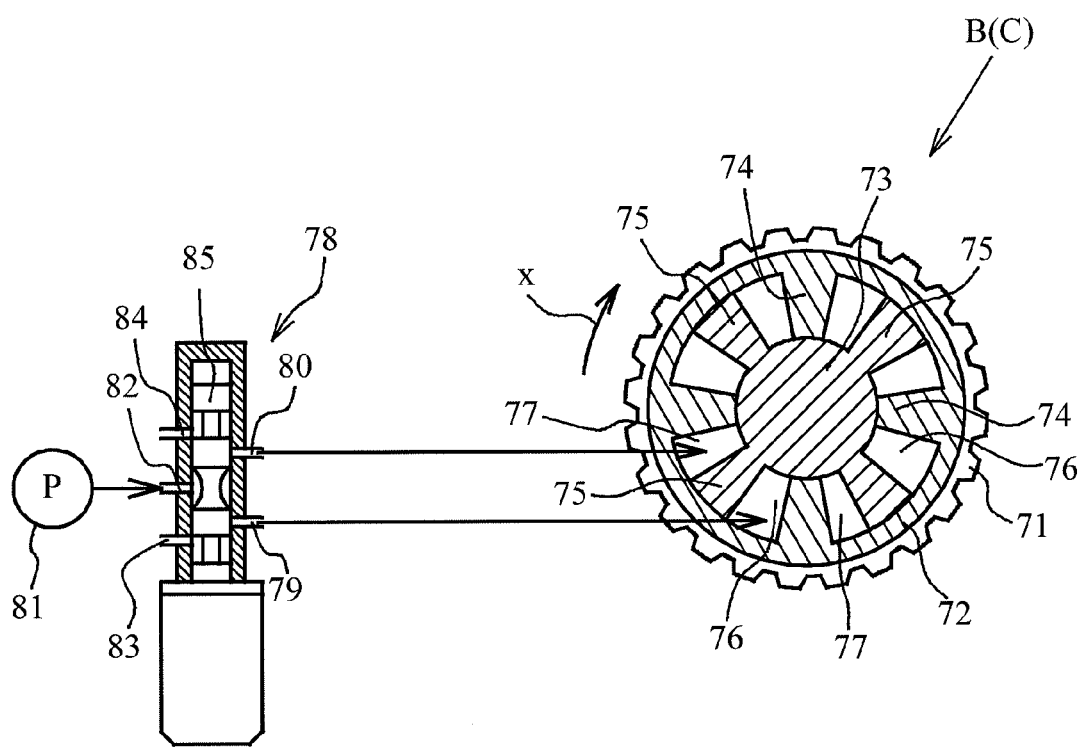
FIG. 4 is an explanatory diagram illustrating the schematic configuration of a variable exhaust valve timing mechanism (a variable intake valve timing mechanism)

FIG. 4 illustrates the variable intake valve timing mechanism B provided for the camshaft 70 for driving the intake valve 7 in FIG. 1. The variable intake valve timing mechanism B is equipped with a cam phase changing unit that changes a phase of the cam of the camshaft 70 and is attached to one end of the camshaft 70.

A description will be given of the cam phase changing unit of the variable intake valve timing mechanism B. The cam phase changing unit includes: a timing pulley 71 that rotates by the crankshaft of the engine 100 through a timing belt in an arrow direction; a cylindrical housing 72 that rotates together with the timing pulley 71; a rotation shaft 73 that rotates together with the camshaft 70, and can rotate relative to a cylindrical housing 72; a plurality of partition walls 74 that extend from an inner circumferential surface of the cylindrical housing 72 to an outer circumferential surface of the rotation shaft 73; and vanes 75 that extend between partition walls 74 and from the outer circumferential surface of the rotation shaft 73 to the inner circumferential surface of the cylindrical housing 72. At the two sides of each vane 75, an advance use hydraulic pressure chamber 76 and a retard use hydraulic pressure chamber 77 are formed.

Feeding of the working oil to the hydraulic pressure chambers 76 and 77 is controlled by a working oil feed control valve 78. This working oil feed control valve 78 is provided with hydraulic pressure ports 79 and 80 which are respectively connected to hydraulic pressure chambers 76 and 77, a feed port 82 of working oil which is discharged from a hydraulic pump 81, a pair of drain ports 83 and 84, and a spool valve 85 which controls connection and disconnection between the ports 79, 80, 82, 83, and 84.

When the phase of the cam of the camshaft 70 is advanced, the spool valve 85 is moved downward in FIG. 4, the working oil which is fed from the feed port 82 is fed through the hydraulic pressure port 79 to the advance use hydraulic pressure chamber 76, and the working oil in the retard use hydraulic pressure chamber 77 is exhausted from the drain port 84. At this time, the rotation shaft 73 rotates relative to the cylindrical housing 72 in an arrow direction X.

On the contrary, when the phase of the cam of the camshaft 70 is retarded, the spool valve 85 is moved upward in FIG. 4, the working oil which is fed from the feed port 82 is fed through the hydraulic pressure port 80 to the retard use hydraulic pressure chamber 77, and the working oil in the advance use hydraulic pressure chamber 76 is exhausted from the drain port 83. At this time, the rotation shaft 73 rotates relative to the cylindrical housing 72 in a direction opposite to the arrow direction X.

When the rotation shaft 73 rotates relative to the cylindrical housing 72, if the spool valve 85 is returned to the neutral position illustrated in FIG. 4, the relative rotational operation of the rotation shaft 73 is stopped and the rotation shaft 73 is held at the relative rotational position at that time. Therefore, the cam phase changing unit can be used to make the phase of the cam of the camshaft 70 advance and retard by a desired amount. That is, the cam phase changing unit can advance and retard the opening timing of the intake valve 7 arbitrarily.

It should be noted that the variable intake valve timing mechanism B illustrated in FIGS. 1 and 4 indicates an example of the variable intake valve timing mechanism, and any types of variable intake valve timing mechanism other than the example illustrated in FIGS. 1 and 4 can be used. The electronic control unit 30 controls an actual compression ratio with the use of the variable compression ratio mechanism A and the variable intake valve timing mechanism B. Thereby, irrespective of engine load, the real compression ratio is kept almost constant, and the improvement in fuel consumption at the time of low load and the output acquisition at the time of high load are attained. It should be noted that the real compression ratio is described later.

Figure 5:
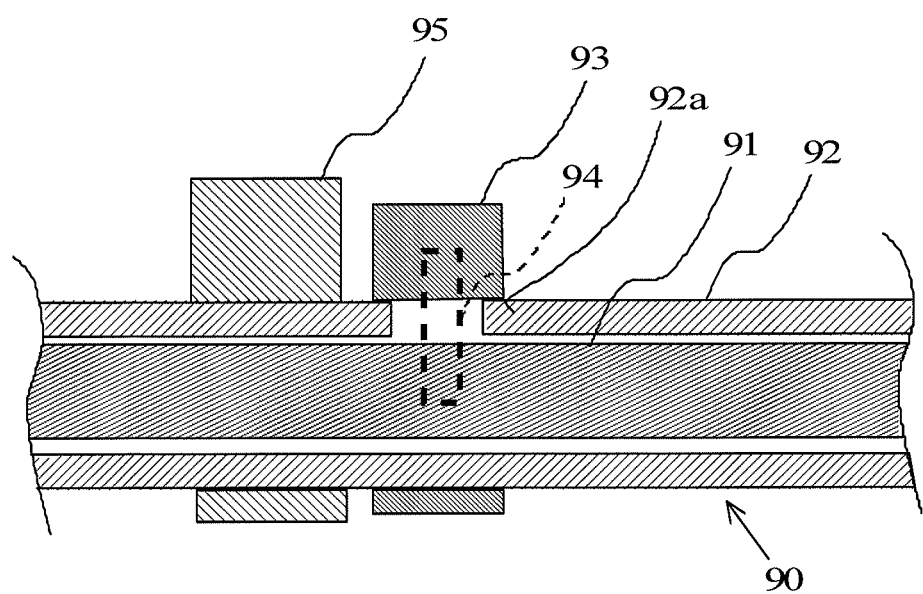
FIG. 5 is an explanatory diagram illustrating an exhaust camshaft that drives an exhaust valve.

Next, a description will be given of the variable exhaust valve timing mechanism C. FIG. 5 is an explanatory diagram illustrating an exhaust camshaft 90 in which phase control is carried out with the variable exhaust valve timing mechanism C. The exhaust camshaft 90 is configured the opening timing of one exhaust valve 9 among the two exhaust valves 9 can be advanced compared to the opening timing of another exhaust valve 9. Specifically, the double structure in which an internal shaft 91 is rotatably inserted into an external shaft 92 enabling free rotation is formed. A first cam 93 is being fixed to the internal shaft 91 with a fixed pin 94. The first cam 93 is exposed outside from a slot 92a provided on the external shaft 92. When the internal shaft 91 rotates relative to the external shaft 92, phase change of the first cam 93 can be carried out. A second cam 95 is fixed to the external shaft 92 by press fitting.

It should be noted that the variable exhaust valve timing mechanism C illustrated in FIGS. 1 and 4 indicates an example of the variable exhaust valve timing mechanism, and any types of variable exhaust valve timing mechanism other than the example illustrated in FIGS. 1 and 4 can be used.

The variable exhaust valve timing mechanism C having same mechanism as the variable intake valve timing mechanism B of FIG. 4 is attached to the internal shaft 91. That is, the same mechanism as the variable intake valve timing mechanism B in which phase control of the intake valve 7 can be performed as mentioned above can perform the phase control of the first cam 93 fixed to the internal shaft 91. Since the operation of the variable exhaust valve timing mechanism C that advances and retards the first cam 93 is the same as that of the variable intake valve timing mechanism B, the detailed explanation thereof is omitted.

Next, a description will be given of the meaning of terms used in the present specification with reference to FIG. 6. Here, FIGS. 6A to 6C illustrate the engine in which the volume of the combustion chamber is 50 ml and a stroke volume is 500 ml for purposes of illustration. The volume of the combustion chamber in FIGS. 6A to 6C expresses a volume of the combustion chamber in the case where the piston is located at the compression top dead center.

Figure 6A:
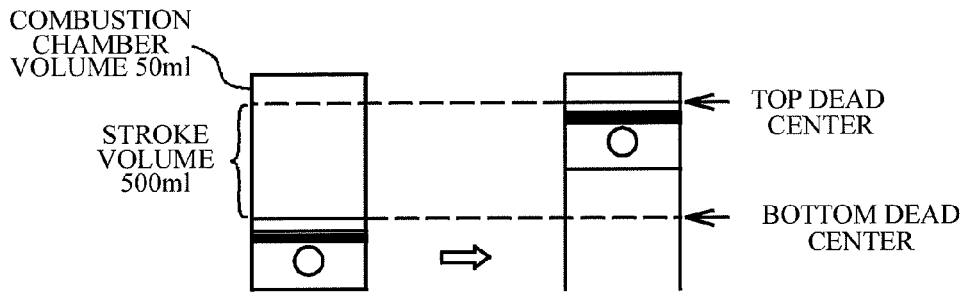
FIGS. 6A to 6C are explanatory diagrams illustrating a mechanical compression ratio, an actual compression ratio, and an expansion ratio.

Next, FIG. 6A illustrates a mechanical compression ratio. The mechanical compression ratio is a value automatically decided from only the stroke volume at the time of a compression stroke, and the volume of the combustion chamber. The mechanical compression ratio is expressed by (the volume of the combustion chamber+the stroke volume)/the volume of the combustion chamber. In the example illustrated in FIG. 6A, the mechanical compression ratio is 11 (=(50 ml+500 ml)/50 ml).

Figure 6B:
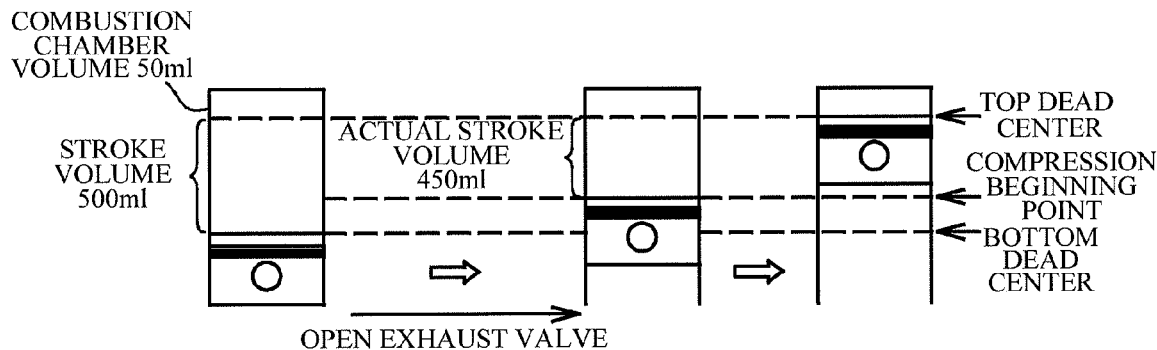

FIG. 6B illustrates an actual compression ratio. The actual compression ratio is a value decided from the actual stroke volume before the piston reaches the top dead center after a compression action is started, and the volume of the combustion chamber. The actual compression ratio is expressed by (the volume of the combustion chamber+the actual stroke volume)/the volume of the combustion chamber. That is, even if the piston starts the rise in the compression stroke, as illustrated in FIG. 6B, the compression action is not performed while the intake valve is opening. The actual compression action is started when the intake valve is closed. Therefore, the actual compression ratio is expressed using the actual stroke volume, as mentioned above. In the example illustrated in FIG. 6B, the actual compression action is 10 (=(50 ml+450 ml)/50 ml).

Figure 6C:
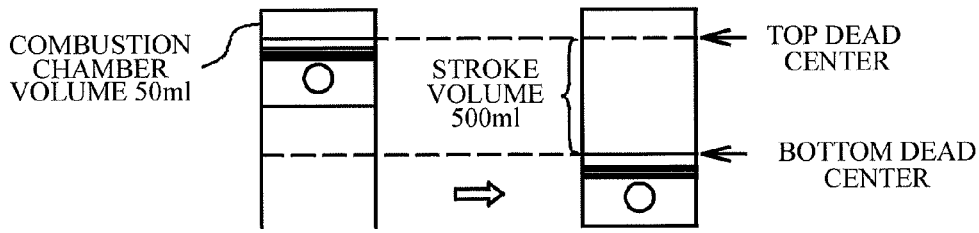

FIG. 6C illustrates an expansion ratio. The expansion ratio is a value decided from the stroke volume at the time of an expansion stroke, and the volume of the combustion chamber. The expansion ratio is expressed by (the volume of the combustion chamber+the stroke volume)/the volume of the combustion chamber. In the example illustrated in FIG. 6C, the expansion ratio is 11 (=(50 ml+500 ml)/50 ml).

Next, a description will be given of an example of control of the present embodiment. Hereinafter, cases is divided and explained according to engine operation states.

<<Case Where the Engine is Operated with Low Load and is Acceleration Time>>

Figure 7:
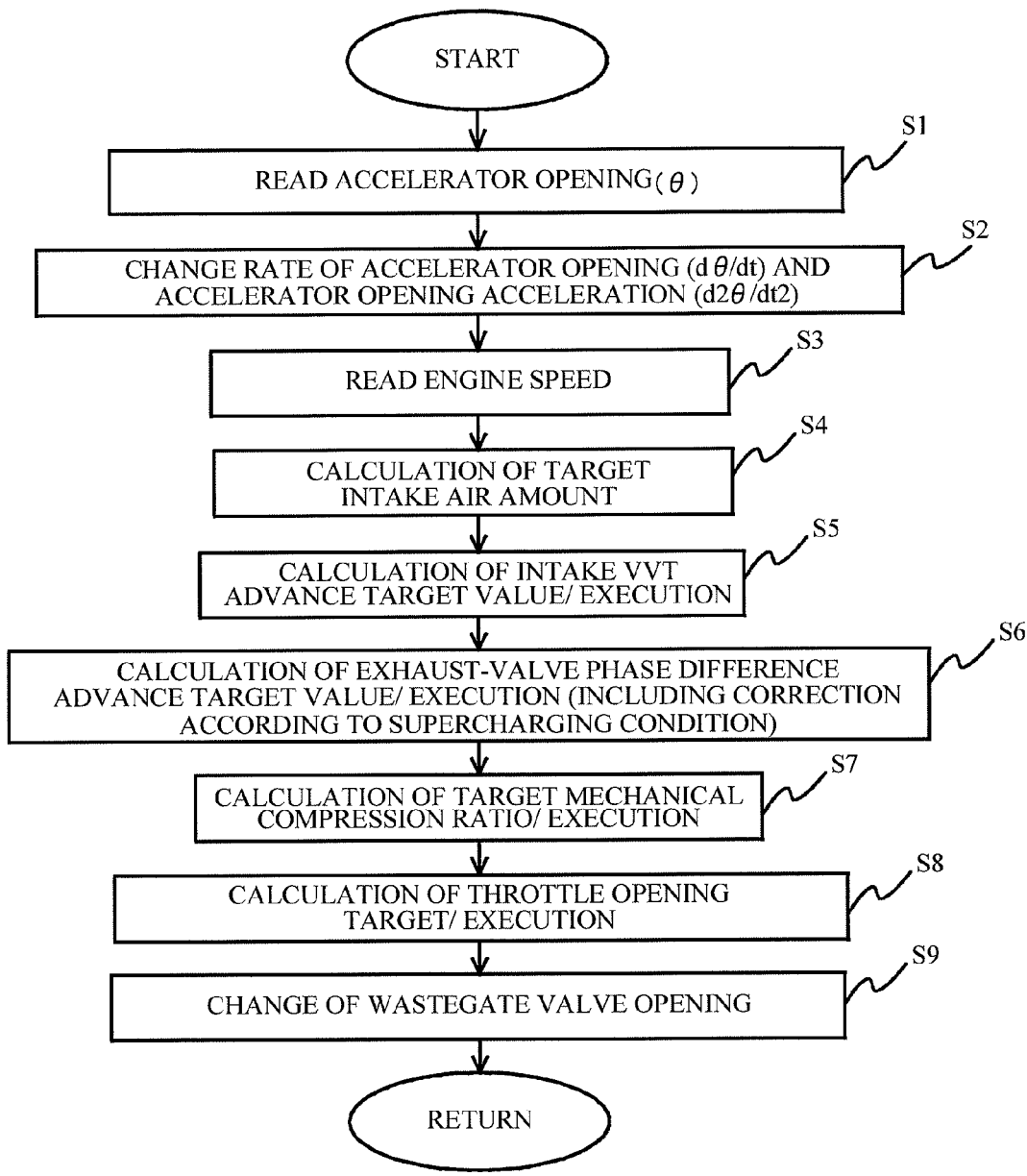
FIG. 7 is a flowchart illustrating an example of control of the engine according to the embodiment.

FIG. 7 is a flowchart illustrating an example of control performed by the electronic control unit 30 when it is determined that the engine 100 is operated with low load and is acceleration time. When it is determined that the engine is operated with low load and is the acceleration time, the maintenance of the expansion ratio and the maintenance or improvement of the response of the exhaust turbocharger 15 serve as a control plan. Thereby, both of improvement in an supercharging response and fuel consumption are targeted.

It should be noted that order of each step in the flowchart illustrated in FIG. 7 can be replaced based on the character, and each step may be processed in simultaneous parallel. Each step is repeatedly performed, and a value acquired by a certain step may be used in other steps.

First, the accelerator position sensor 41 connected to the accelerator pedal 40 reads an accelerator opening (θ) in step S1. Then, consecutively, the electronic control unit 30 calculates a rate of change of the accelerator opening (dθ/dt) and an accelerator opening acceleration ($d^2θ/dt^2$) in step S2. In step S3, the electronic control unit 30 reads an engine speed based on information which the crank angle sensor 42 has acquired.

When the rate of change of the accelerator opening (dθ/dt) and/or the accelerator opening acceleration ($d^2θ/dt^2$) thus calculated are more than constant values, it can be determined that the engine 100 is the acceleration time. Here, when the change of a transmission output (rpm) or the change of a value calculated by multiplying the engine speed by a gear ratio is positive, it can be determined that the engine 100 is the acceleration time.

Figure 8:
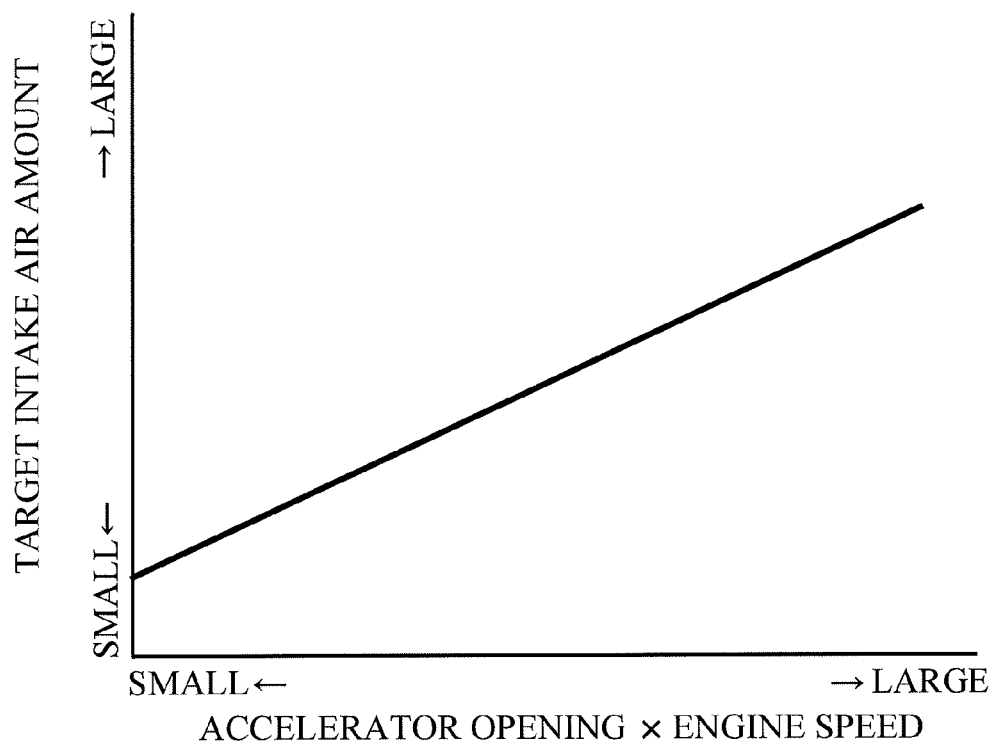
FIG. 8 illustrates an example of a map for deciding a target intake air amount.
Figure 9:
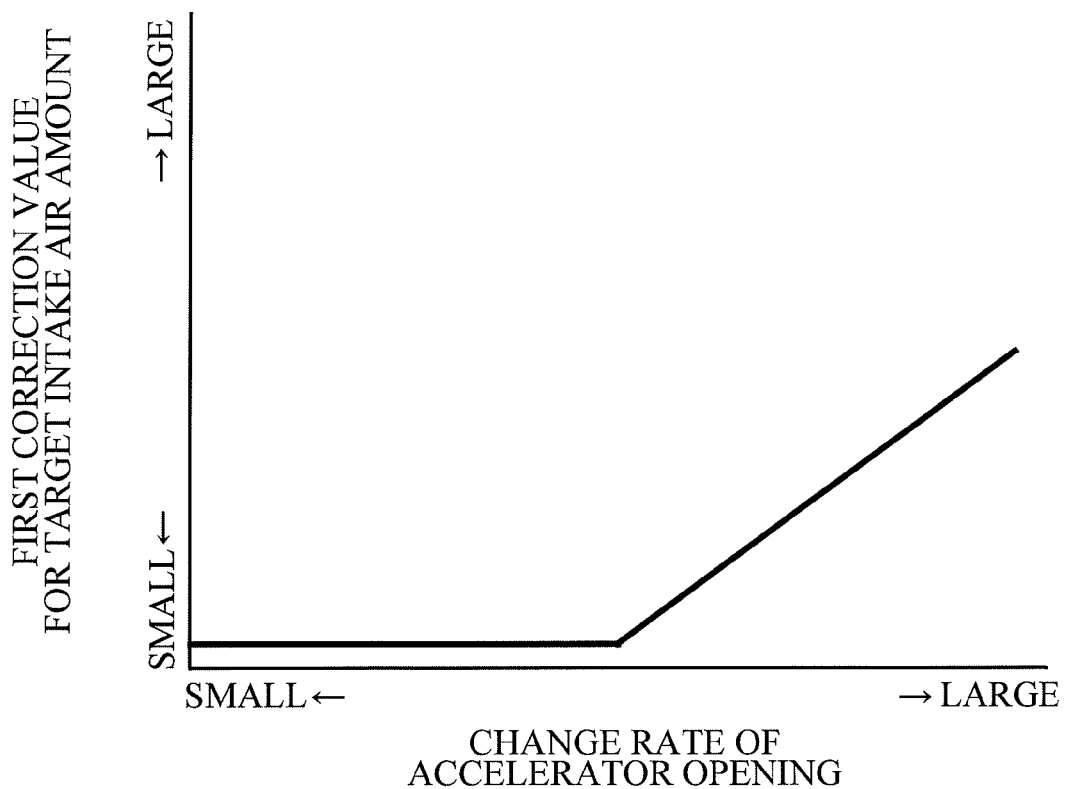
FIG. 9 illustrates an example of a map for deciding a first correction value for correcting the target intake air amount.
Figure 10:
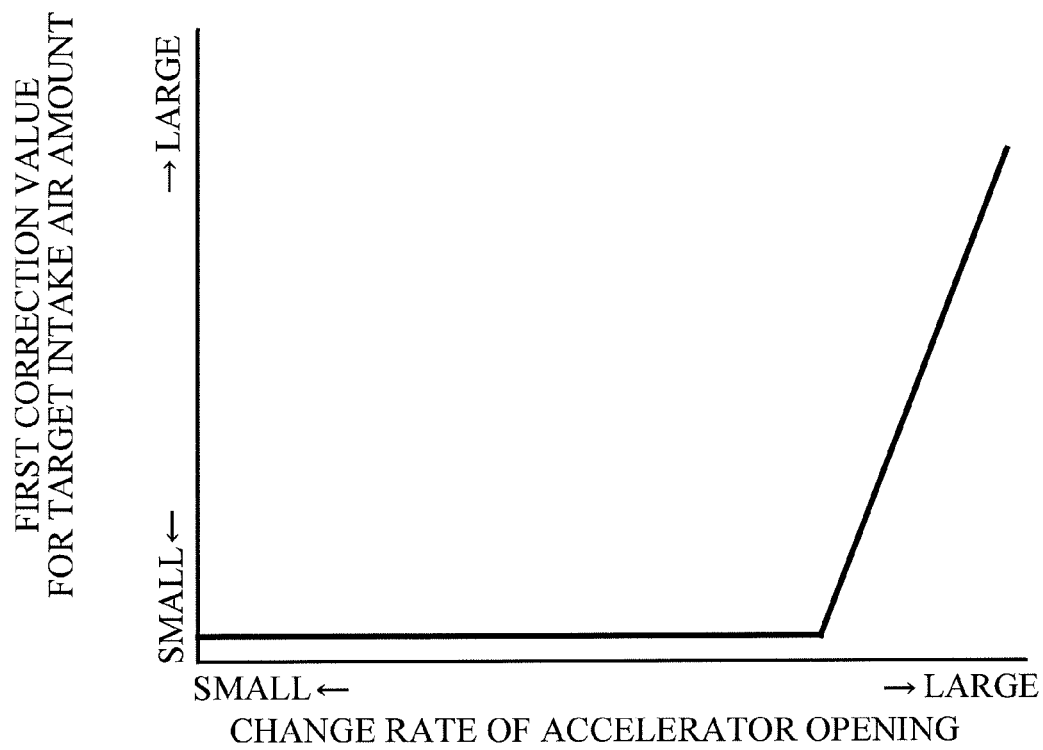
FIG. 10 illustrates an example of a map for deciding a second correction value for correcting the target intake air amount.

Then, the electronic control unit 30 calculates a target intake air amount in consideration of the accelerator opening (θ) and the engine speed in step S4. The target intake air amount can be calculated based on a map in FIG. 8 indicating an example of the target intake air amount. At this time, a first correction value for the target intake air amount is calculated based on the rate of change of the accelerator opening (dθ/dt). When the rate of change of the accelerator opening, i.e., an accelerator opening speed exceeds a given value as illustrated in an example of a map in FIG. 9, the first correction value for the target intake air amount increases according to the increment of the accelerator opening speed. Moreover, a second correction value for the target intake air amount is calculated based on the accelerator opening acceleration ($d^2θ/dt^2$). When the accelerator opening acceleration exceeds a given value as illustrated in an example of a map in FIG. 10, the second correction value for the target intake air amount increases according to the increment of the accelerator opening acceleration. The target intake air amount is decided in consideration of the first correction value for the target intake air amount and the second correction value for the target intake air amount. Thus, the correction values based on the rate of change of the accelerator opening and the accelerator opening acceleration are taken into consideration because a driver's intention is expressed by the operation of the accelerator pedal 40 and transmitted to the engine 100.

It can be determined from the target intake air amount and the engine speed whether the engine 100 is the low load. That is, when the target intake air amount and the engine speed are equal to or less than given values, respectively, it can be determined that the engine 100 is the low load.

Figure 11:
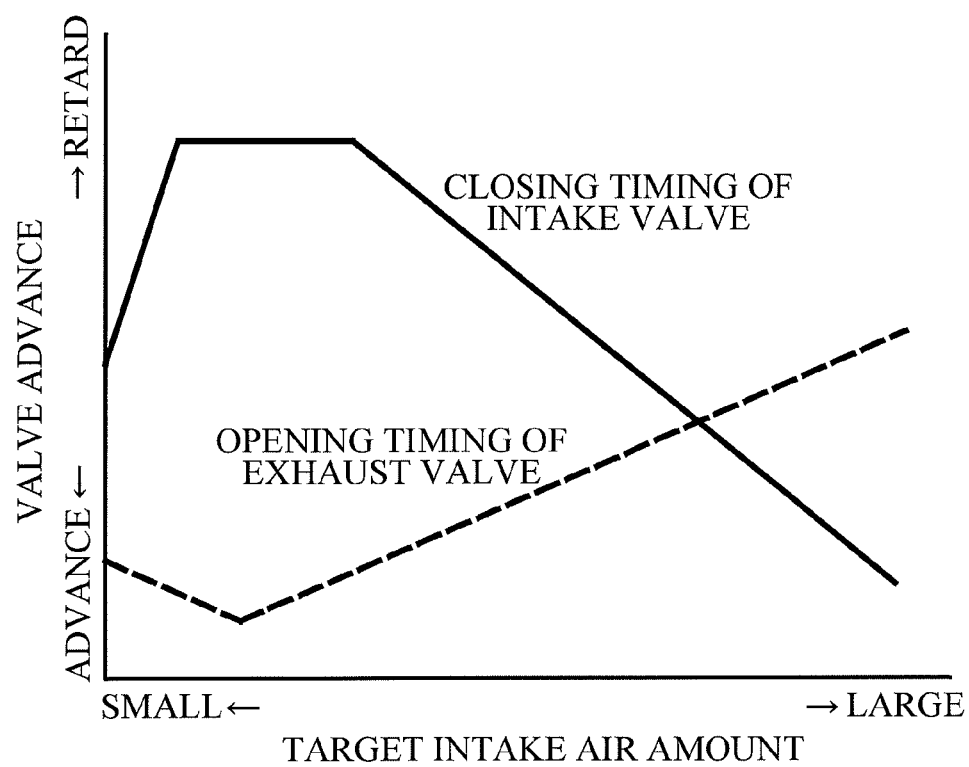
FIG. 11 illustrates an example of a map for deciding closing timing of an intake valve and opening timing of an exhaust valve with respect to the target intake air amount.

In step S5, the electronic control unit 30 calculates an advance target value by the variable intake valve timing mechanism B (intake VVT: intake Variable Valve Timing), and executes advance control. Specifically, the electronic control unit 30 decides an advance amount of the closing timing of the intake valve 7 based on the target intake air amount, as illustrated in FIG. 11. The closing timing of the intake valve 7 is set according to a map falling to the right in which the advance amount increases as the target intake air amount increases, as illustrated in FIG. 11.

By applying this map, the electronic control unit 30 performs the following control in a state where the closing timing of the intake valve has been changed into a side in which the compression ratio is reduced, with the variable intake valve timing mechanism B. That is, when it is determined that the engine 100 is the acceleration time, the electronic control unit 30 changes the closing timing of the intake valve 7 in a direction in which the compression ratio is improved, with the use of the variable intake valve timing mechanism B. When the closing timing of the intake valve 7 is retarded and the compression ratio is reduced, for example, the closing timing of the intake valve is advanced. This is based on the following reasons.

The closing timing of the intake valve is changed in the direction in which the compression ratio is improved, so that an amount of air which remains in the cylinders of the engine 100 increases. This make it possible to increase the energy of the exhaust gas exhausted out of the cylinders, and improve the response of the exhaust turbocharger 15. When the response of the exhaust turbocharger 15 improves, the acceleration comes to good.

On the other hand, by applying the map illustrated in FIG. 11, the electronic control unit 30 performs the following control in a state where the closing timing of the intake valve has been changed into a side in which the compression ratio is reduced with the variable intake valve timing mechanism B. That is, when it is determined that the acceleration request of the engine 100 has reduced, the electronic control unit 30 changes the closing timing of the intake valve 7 in a direction reducing the compression ratio with the use of the variable intake valve timing mechanism B. When the closing timing of the intake valve 7 is temporarily advanced in response to the acceleration request as described above in the state where the closing timing of the intake valve 7 is retarded and the compression ratio is reduced for example, the closing timing of the intake valve 7 is controlled to an advance side again. The temporarily lowered rate of expansion is improved again, so that thermal efficiency and fuel consumption can be improved.

Here, in FIG. 11, an ever-increasing part and a substantially horizontal part on a line segment indicating the closing timing of the intake valve indicates adjusting the intake air amount (i.e., load) by throttling since there is few air amount in the low load state.

In step S6, the electronic control unit 30 calculates an exhaust-valve phase difference advance target value of the variable intake valve timing mechanism B, and performs the advance control. Specifically, the electronic control unit 30 decides an advance amount of the opening timing of the exhaust valve 9 based on the target intake air amount, as illustrated in FIG. 11. The opening timing of the exhaust valve 9 is set according to a map rising to the right in which the advance amount decreases as the target intake air amount increases, as illustrated in FIG. 11, i.e., a map falling to the right in which the advance amount increases as the target intake air amount decreases. Here, in FIG. 11, a part falling to the right on a line segment indicating the opening timing of the exhaust valve indicates a domain near idling which does not have the necessity for supercharging clearly. Therefore, in the advance control of the opening timing of the exhaust valve 9, the domain which does not need supercharging and has a very low load such as the idling is excepted. This is because when the supercharging is not required, the opening timing of the exhaust valve is not advanced and the thermal efficiency of the engine is not reduced.

As a basic control in a case where it is determined that the engine 100 is operated with the low load and is the acceleration time, the electronic control unit 30 controls the opening timing of the first cam 93 illustrated in FIG. 5 to the advance side with the variable exhaust valve timing mechanism C. That is, the electronic control unit 30 advances the opening timing of one exhaust valve 9 relative to the opening timing of another exhaust valve 9. By the exhaust valve 9 operated with the first cam 93 opening early, an exhaust pressure which is supplied to the exhaust turbocharger 15, and an exhaust temperature are raised, and hence the response of the exhaust turbocharger 15 can be improved. On the other hand, since the opening timing of the exhaust valve operated with the second cam 95 which is a fixed cam is retarded relative to the exhaust valve 9 operated with the first cam 93, the expansion ratio is maintained. Thereby, both of the improvement or the maintenance of the supercharging response and the improvement or the maintenance of the fuel consumption can be achieved.

Moreover, by applying the map illustrated in FIG. 11, the electronic control unit 30 controls the advance amount of the opening timing of the one exhaust valve 9 with the use of the variable exhaust valve timing mechanism C so that the smaller the target intake air amount, the larger the advance amount of the opening timing of the one exhaust valve 9. That is, the advance amount of the opening timing of the exhaust valve 9 operated with the first cam 93 is increased. Here, as the target intake air amount, the intake air amount measured by the intake air detector 16 can be used.

This is because, since the energy of the exhaust gas supplied to the exhaust turbocharger 15 is small as the intake air amount is small, the electronic control unit 30 advances the opening timing of the exhaust valve 9 and increases an amount of the exhaust gas supplied to the exhaust turbocharger 15, thereby improving the supercharging response. Here, it is desirable that the control of the opening timing of the exhaust valve 9 is performed in the range in which both of the supercharging response and the fuel consumption are improved. Therefore, for example, data on a unit test of the engine and the fuel consumption and a feeling of acceleration in an actual vehicle can be collected, and the data can be reflected on the map (for example, the map illustrated in FIG. 11) which indicates the opening timing characteristic of the exhaust valve.

On the other hand, by applying the map illustrated in FIG. 11, when it is determined that the acceleration request of the engine 100 has reduced, the electronic control unit 30 retards the opening timing of the one exhaust valve 9 in which the opening timing has been advanced. Thereby, the temporarily lowered rate of expansion is raised again, so that the thermal efficiency is improved. As a result, the fuel consumption can be improved.

Here, when the advance control of the opening timing of the exhaust valve 9 is performed, ignition retard control may be performed together in order to further improve the exhaust energy.

A correction measure on which the supercharging situation that has considered the change of the wastegate valve opening in step S9 is reflected may be included in the calculation of the advance target value of the exhaust valve 9.

Figure 13:
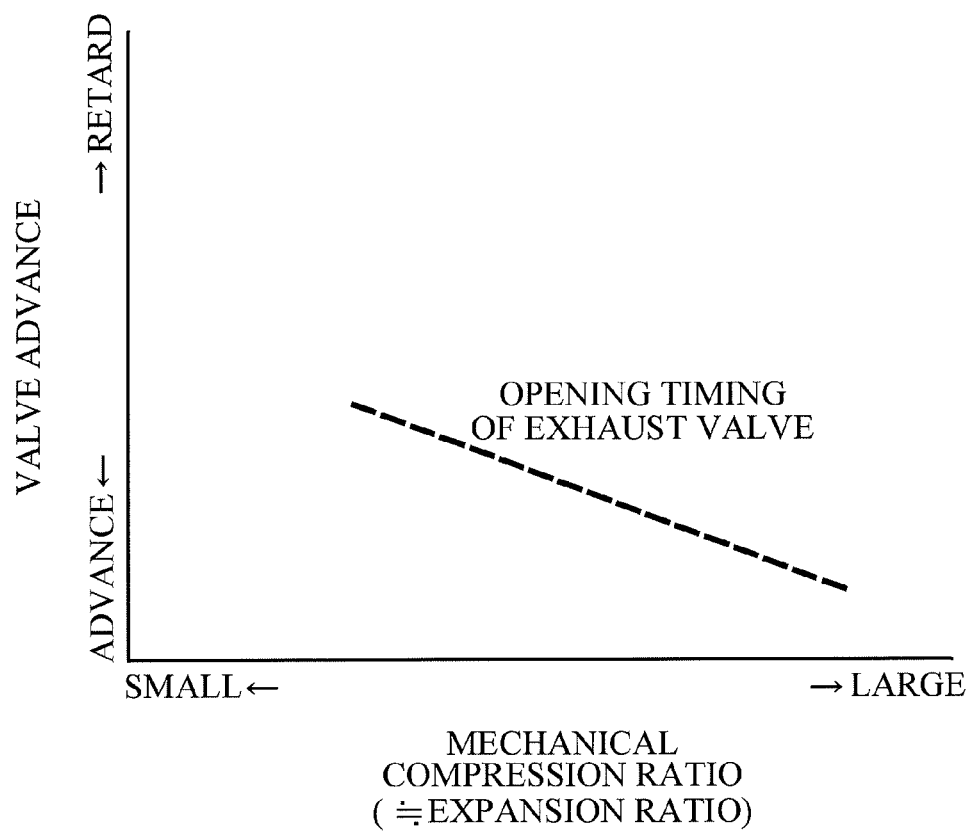
FIG. 13 illustrates an example of a graph illustrating a relationship between the mechanical compression ratio (≈the expansion ratio) and the opening timing of the exhaust valve.

Further, the electronic control unit 30 can perform the control in which the smaller the expansion ratio, the smaller the advance amount of the opening of the one exhaust valve 9, based on an example of a map in FIG. 13. In the control performed with reference to the map illustrated in FIG. 11, when the advance amount of the opening timing of the exhaust valve 9 increases and the expansion ratio is small, the electronic control unit 30 can decrease the advance amount. To further advance the opening timing of the exhaust valve 9 in a state where the expansion ratio is small has large influence on aggravation of the fuel consumption. Therefore, in such a case, the advance amount is decreased. Since the expansion ratio is substantially identical with the mechanical compression ratio calculated in step S7 described later, the value acquired in step S7 can be used as the expansion ratio.

Figure 12:
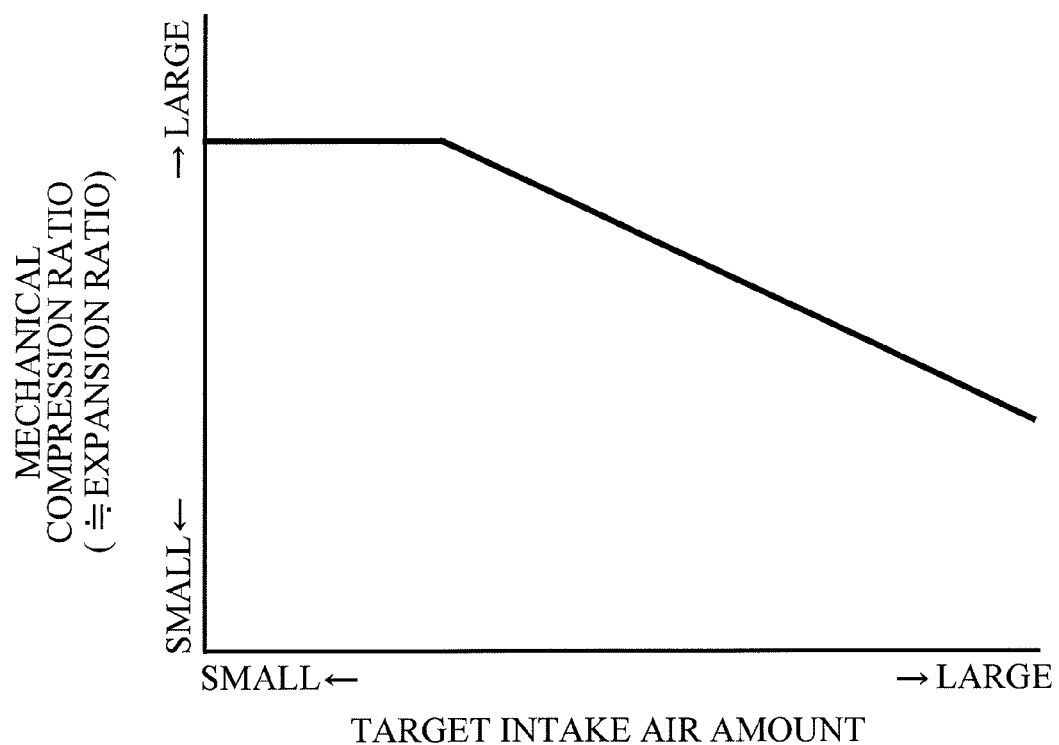
FIG. 12 illustrates an example of a map for deciding the mechanical compression ratio (≈the expansion ratio) with respect to the target intake air amount.

The electronic control unit 30 calculates a target mechanical compression ratio and executes control in step S7. The mechanical compression ratio is calculated based on an example of a map in FIG. 12. The larger the target intake air amount, the smaller the mechanical compression ratio. The electronic control unit 30 changes the mechanical compression ratio by transmitting a command to the variable compression ratio mechanism A.

Figure 14:
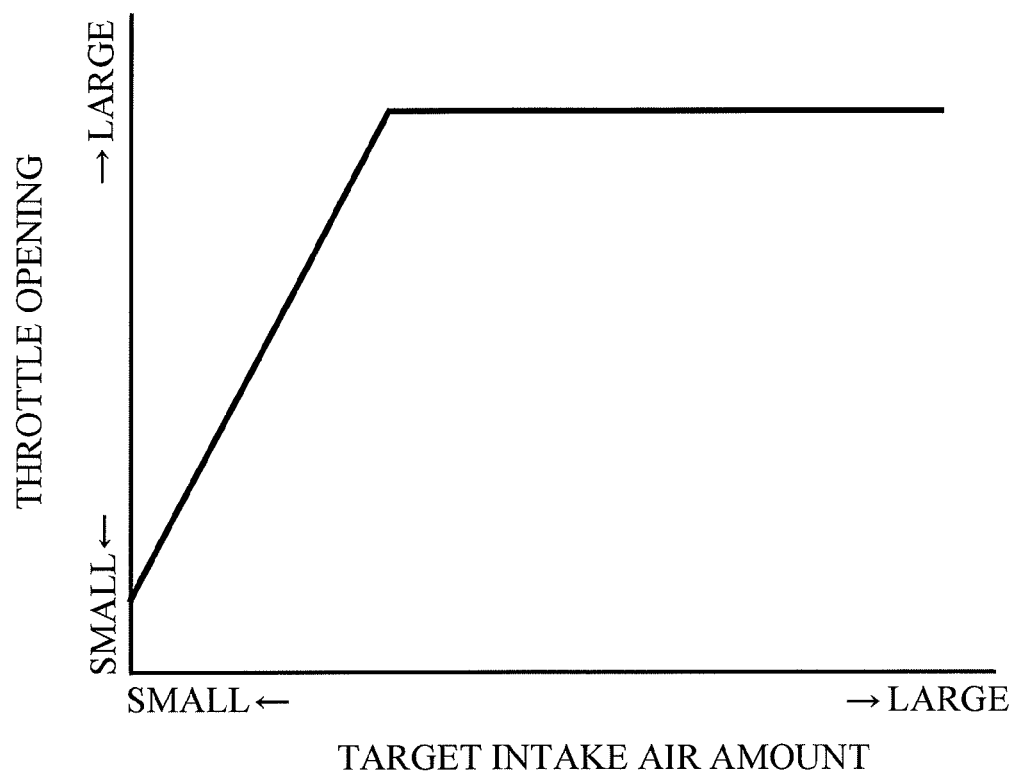
FIG. 14 is an explanatory diagram illustrating an example of a relationship between the target intake air amount and a throttle opening.
Figure 15:
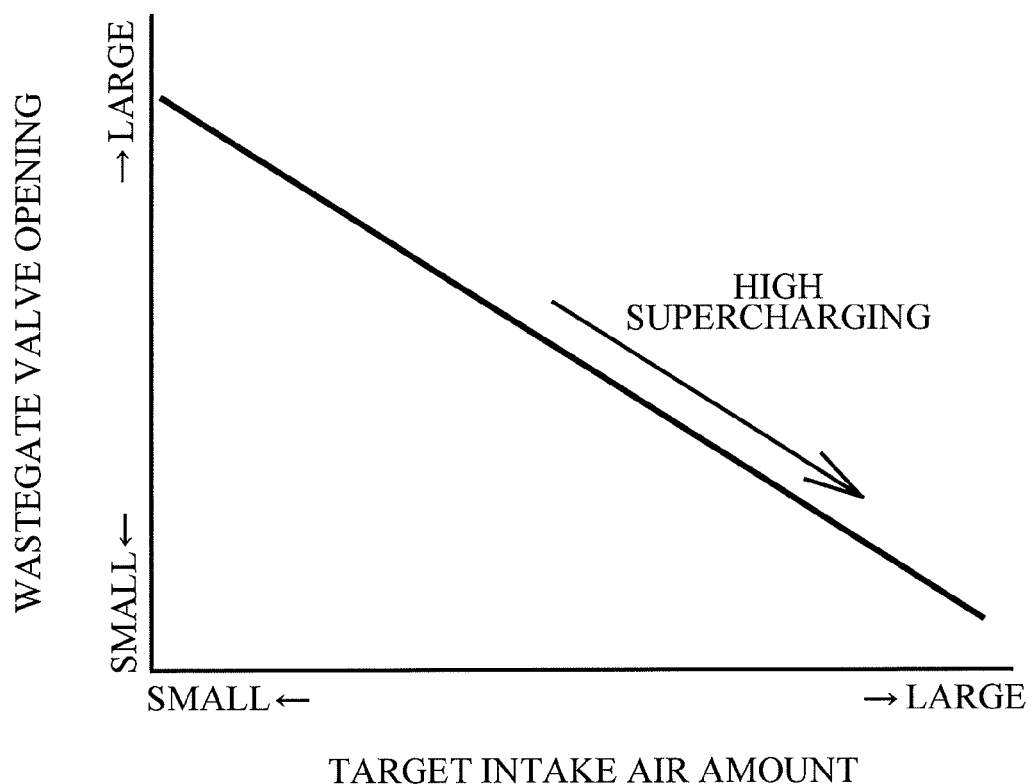
FIG. 15 is an explanatory diagram illustrating an example of a relationship between the target intake air amount and a wastegate valve opening.

The electronic control unit 30 calculates a throttle opening target and executes control in step S8. The throttle opening is calculated based on an example of a map in FIG. 14.

The electronic control unit 30 repeatedly performs the control described above. The engine 100 is equipped with the wastegate valve 24. The opening of the wastegate valve 24 is changed according to the change of the target intake air amount (step S9). Specifically, when the target intake air amount is large and the actual intake air amount is also large, the opening of the wastegate valve 24 becomes small and the engine 100 becomes a high supercharging state. The opening of the wastegate valve 24 may be taken into consideration with the exhaust-valve phase difference advance target value in step S6.

It should be noted that each of the intake air VVT advance target value calculated in step S5, the exhaust-valve phase difference advance target value calculated in step S6, the target mechanical compression ratio calculated in step S7, and the throttle opening target calculated in step S8 may be corrected based on environmental data. Here, the environmental data is various data taken into consideration in order to calculate the mass of the air actually introduced in the cylinders of the engine 100 with sufficient accuracy. Concrete data which can be included in the environmental data are data on an oil temperature, data on a water temperature, data on an intake temperature, data on an atmospheric pressure, data on an intake pipe pressure, and so on. By taking the environmental data into consideration, a temperature in a compression end can be predicted with sufficient accuracy, knocking can be avoided, and a favorable combustion state can be acquired.

Figure 16:
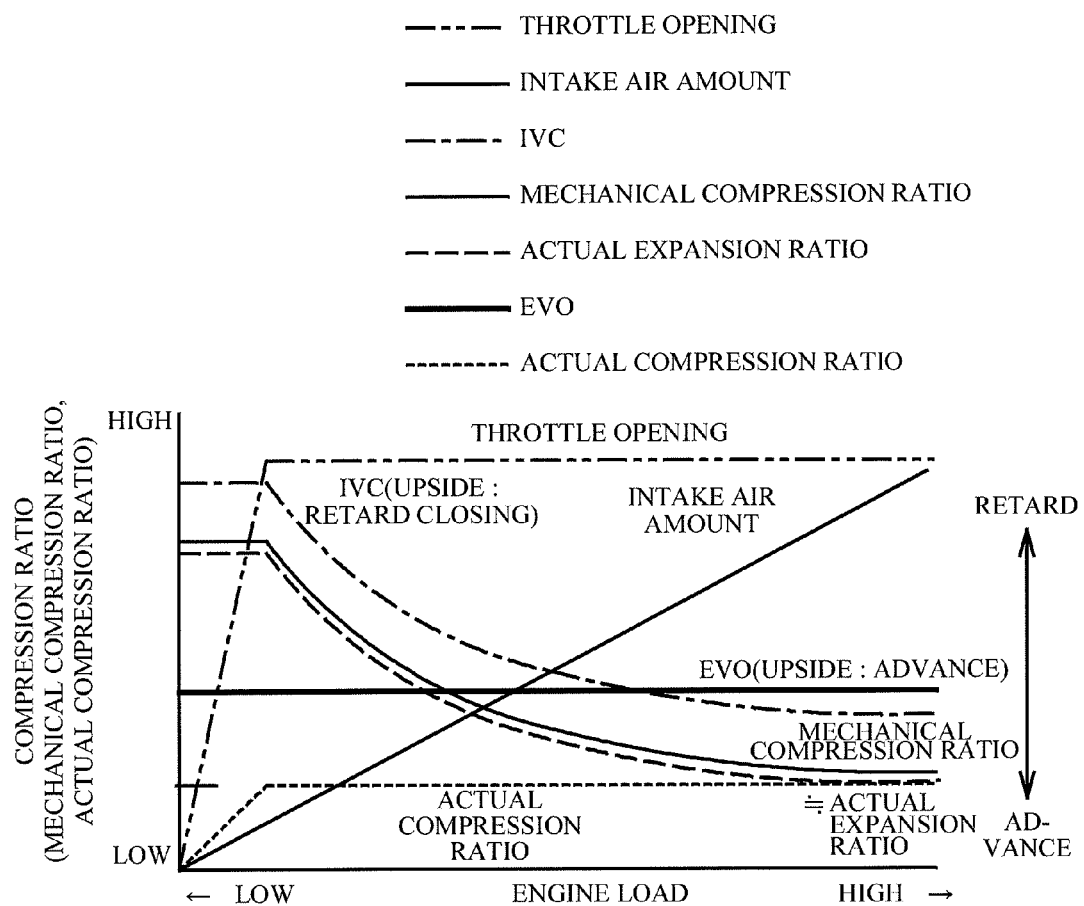
FIG. 16 is an explanatory diagram illustrating an example of the change of various parameters of an engine according to a comparative example.
Figure 17:
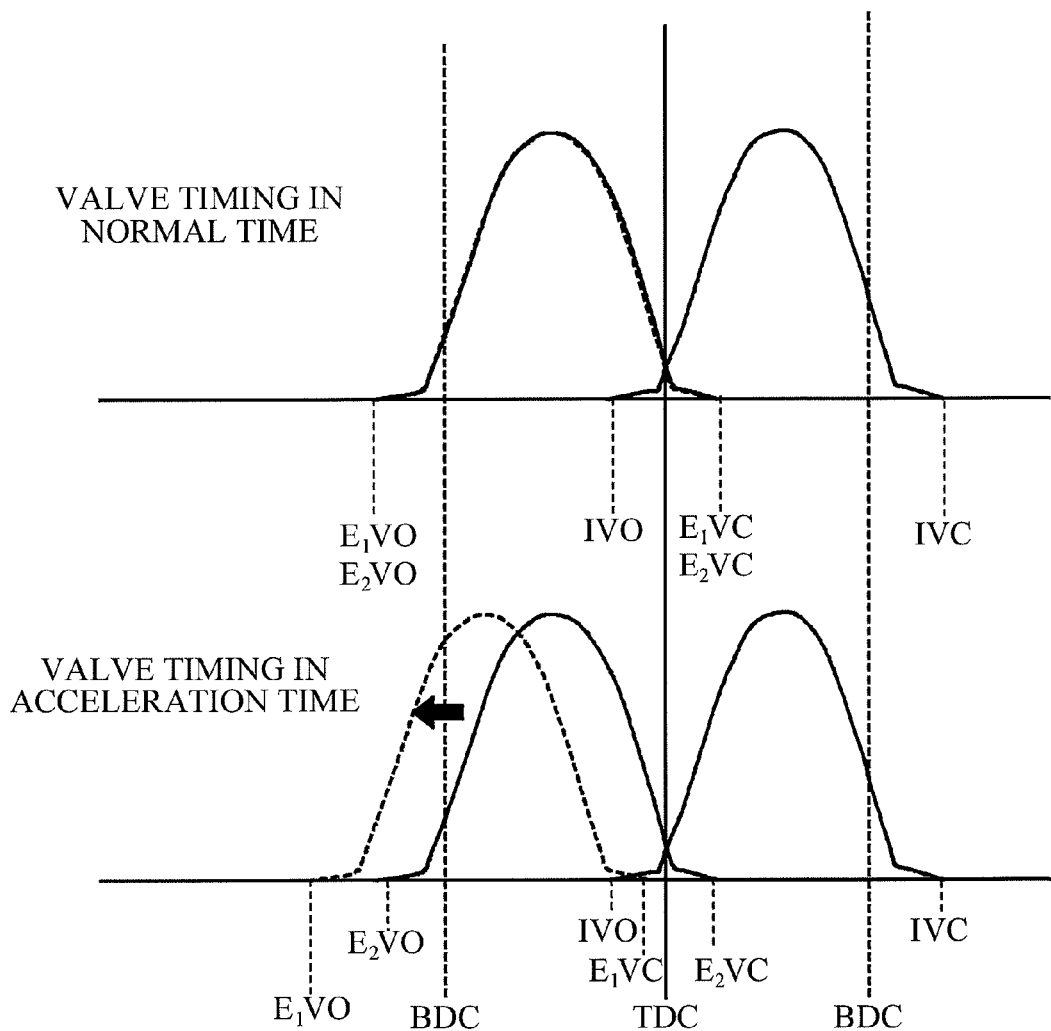
FIG. 17 is a graph illustrating an example of valve timing in acceleration time.
Figure 18:
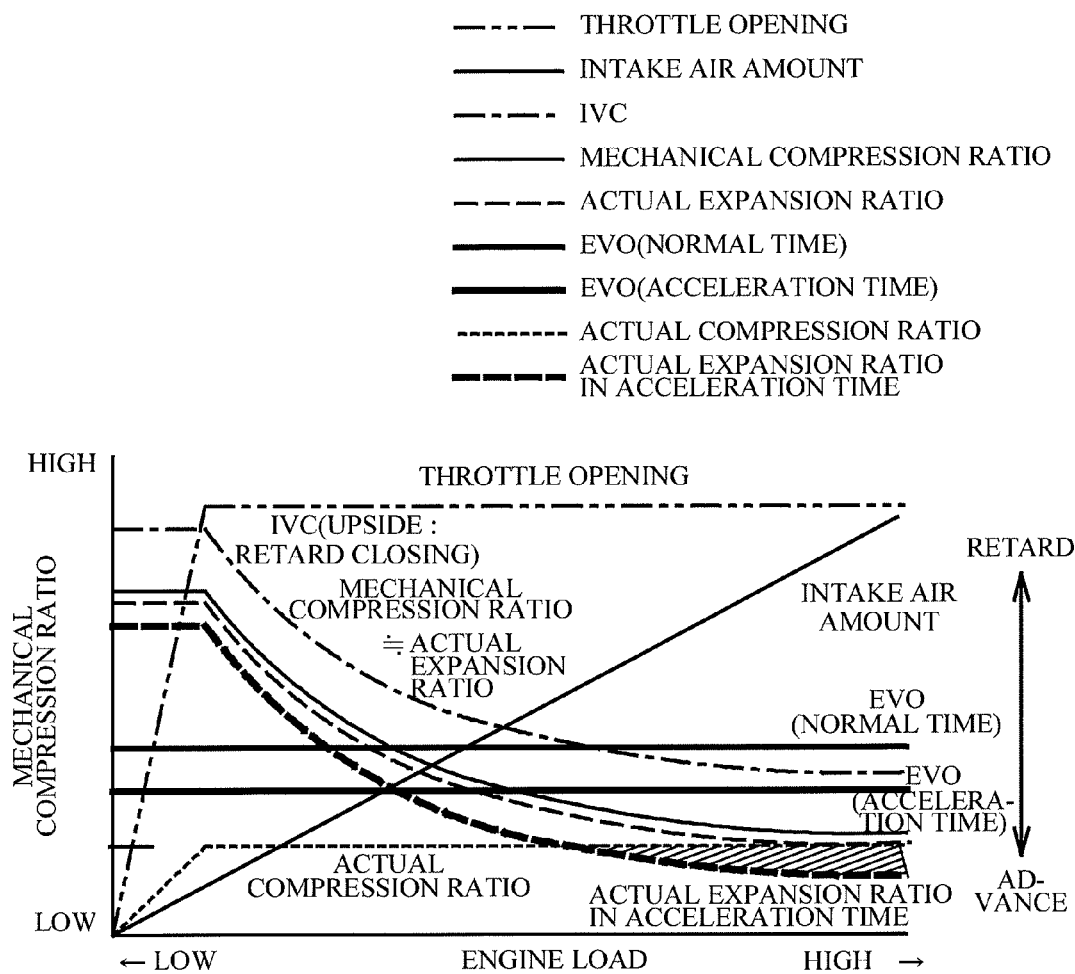
FIG. 18 is an explanatory diagram illustrating an example of the change of various parameters of the engine according to the embodiment.

A description will be given of the features of the engine 100 in which an example of control is described above, with reference to FIGS. 16 to 18. FIG. 16 is an explanatory diagram illustrating an example of the change of various parameters of the engine according to a comparative example. FIG. 17 is a graph illustrating an example of valve timing in acceleration time as compared with valve timing in normal time. FIG. 18 is an explanatory diagram illustrating an example of the change of various parameters of the engine 100 according to the embodiment.

An engine of a comparative example in which the change of various parameters is illustrated in FIG. 16 is equipped with the variable compression ratio mechanism A and the variable intake valve timing mechanism B, but not equipped with the variable exhaust valve timing mechanism C. At the time of steady running, such an engine is controlled to secure the expansion ratio as much as possible. When the amount of depression of the accelerator pedal is adjusted according to a driver's intention, the throttle opening of the engine according to the comparative example is maintained at a full throttle state except for a region of a very low load. Then, the closing timing of the intake valve (IVC) is controlled. The reason why the throttle opening is adjusted to the full throttle is to reduce an intake loss and to control the air amount.

In the engine of the comparative example, the variable compression ratio mechanism cooperates with the variable intake valve timing mechanism in the very low load or more. By raising the mechanical compression ratio and closing the intake valve late in a low load side, the engine of the comparative example can set the expansion ratio greatly with keeping the same real compression ratio as the compression ratio of a high load side. Thereby, the thermal efficiency can be improved.

According to FIG. 16, the throttle opening is maintained at the full throttle when the engine load is equal to or more than a given engine load. The intake air amount becomes large with increase of the engine load. The IVC, i.e., the closing timing of the intake valve 7 shifts to an advance side as the engine load turns into the high load. That is, as the engine load turns into the low load, the closing timing of the intake valve 7 shifts to a retard side and is controlled to be late. The mechanical compression ratio becomes low as the engine load turns into the high load. That is, as the engine load turns into the high load, the mechanical compression ratio is controlled to become low so that the actual compression ratio becomes constant. The expansion ratio is substantially the same as the mechanical compression ratio. It should be noted that EVO, i.e., the opening timing of the exhaust valve is constant.

On the other hand, the engine according to the present embodiment is equipped with the variable exhaust valve timing mechanism C, unlike the comparative example. The equipment of the variable compression ratio mechanism A and the variable intake valve timing mechanism B is common to the present embodiment and the comparative example. A description will be given of the valve timing of the engine 100 according to the present embodiment, with reference to FIG. 17. First, in normal time, the opening timing $E_1VO$ of the exhaust valve 9 driven with the variable first cam 93 is identical with the opening timing $E_2VO$ of the exhaust valve driven with the fixed second cam 95. On the contrary, in acceleration time, the opening timing $E_1VO$ is advanced relative to the opening timing $E_2VO$.

A description will be given of the change of various parameters of the engine 100 according to the present embodiment that is controlled to be such valve timing, with reference to FIG. 18. According to FIG. 18, the change of the parameters other than the EVO of the acceleration time and the actual expansion ratio of the acceleration time are substantially the same as those of the engine of the comparative example. The EVO of the acceleration time concerning one exhaust valve is advanced, so that the actual expansion ratio of the acceleration time lowers. In FIG. 18, an area illustrated by hatching in which the actual expansion ratio is less than the actual compression ratio indicates an amount of energy used for the improvement in the response of the exhaust turbocharger 15 by opening the exhaust valve early.

As described above, in the engine 100 according to the present embodiment, both of the improvement or the maintenance of the supercharging response of the exhaust turbocharger 15 and the improvement or the maintenance of the fuel consumption by the maintenance of the high expansion ratio are achieved.

<<Case Where the Engine is Operated with a Load Equal to or More Than a Middle Load, and is in a Steady Supercharging Operation State in Which the Supercharging is Performed by the Exhaust Turbocharger>>

Figure 19:
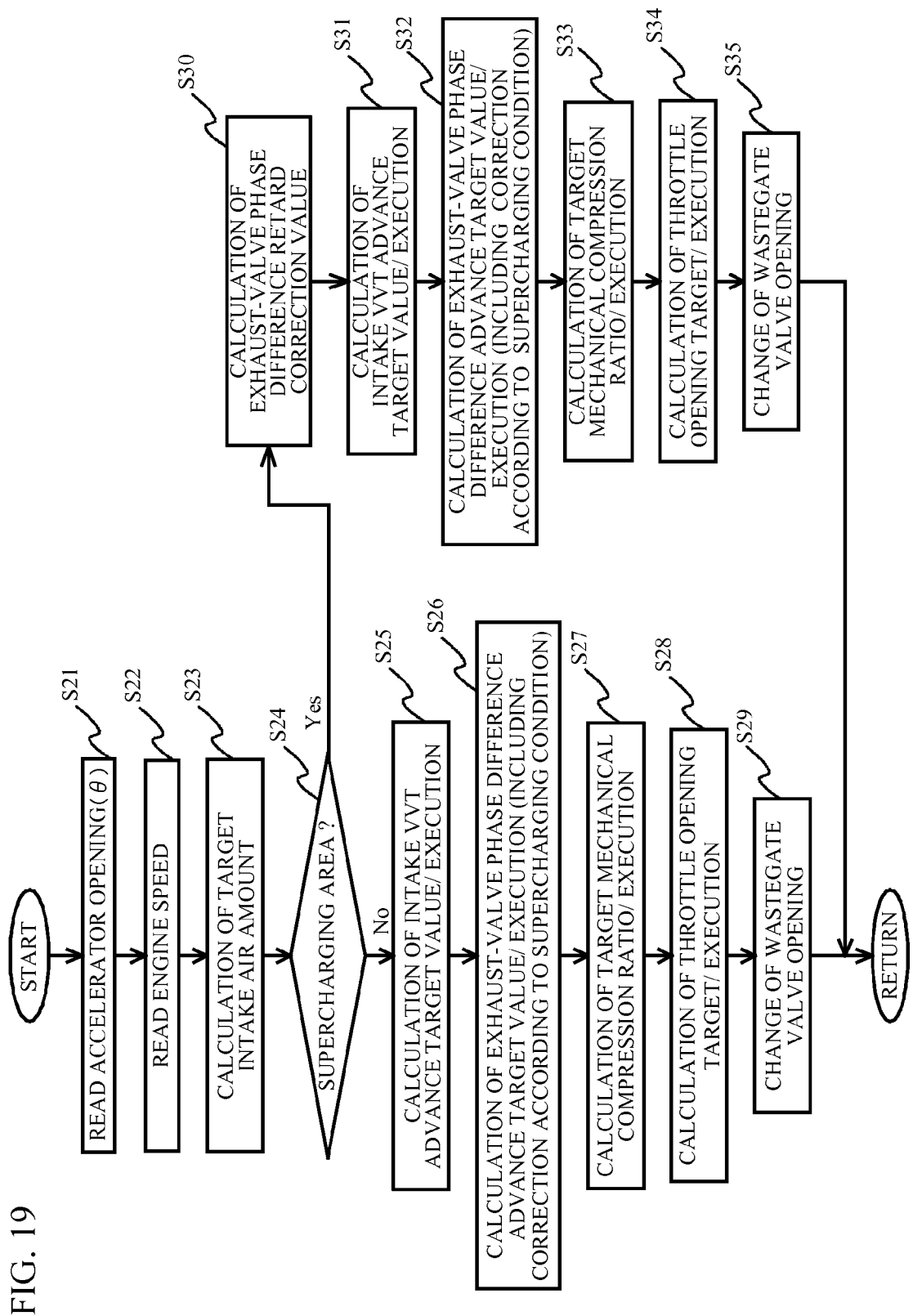
FIG. 19 is a flowchart illustrating an example of control of the engine according to the embodiment.

FIG. 19 is a flowchart illustrating an example of control which the electronic control unit 30 performs in a case where the engine 100 is operated with a load equal to or more than a middle load and is in a steady supercharging operation state in which the supercharging is performed by the exhaust turbocharger 15. When the engine is operated with the load equal to or more than the middle load and is in the steady supercharging operation state in which the supercharging is performed by the exhaust turbocharger, there are a large amount of air in the cylinders as compared with non-supercharging time and the supercharging response is maintained. Therefore, the improvement in the expansion ratio by controlling the opening timing of the exhaust valve 9 to a retard side serve as the control plan.

It should be noted that order of each step in the flowchart illustrated in FIG. 19 can be replaced based on the character, and each step may be processed in simultaneous parallel. Each step is repeatedly performed, and a value acquired by a certain step may be used in other steps.

First, in step S21, the accelerator position sensor 41 connected to the accelerator pedal 40 reads the accelerator opening (θ). In step S22, the electronic control unit 30 reads the engine speed based on information which the crank angle sensor 42 has acquired. In step S23, the electronic control unit 30 calculates the target intake air amount. Since the calculation of the intake air amount is performed in the same manner as the processing of step S4 in the flowchart illustrated in FIG. 7, the detailed description is omitted.

Figure 20:
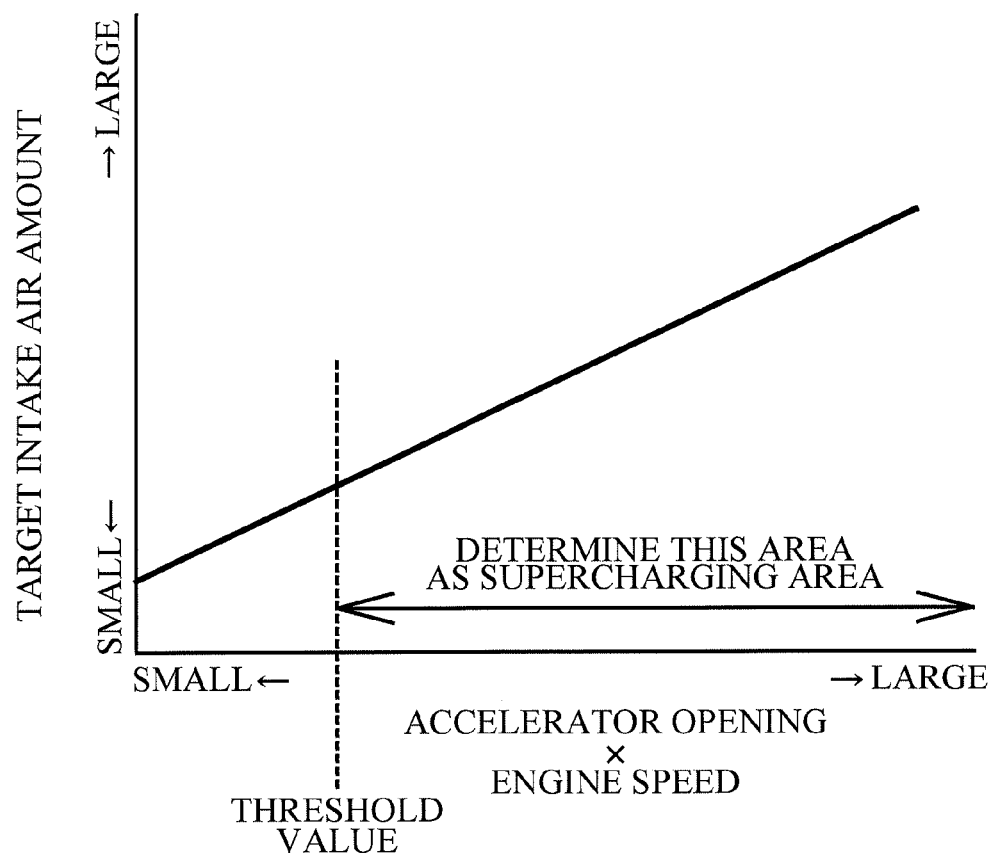
FIG. 20 illustrates an example of a map for deciding the target intake air amount.

The electronic control unit 30 determines whether the engine is in a supercharging area in step S24. Specifically, the electronic control unit 30 determines it based on whether a value acquired from the accelerator opening and the engine speed has exceeded a given value with reference to an example of a map illustrated in FIG. 20. It should be noted that the electronic control unit 30 can determine it by using the wastegate valve opening and the intake pipe pressure. The electronic control unit 30 can also determine whether the engine is equal to or more than the middle load by using the given value.

When the result of the determination of step S24 is NO, the processes of steps S25 to S29 are performed. Since the processes of steps S25 to S29 are performed in the same manner as the processes of steps S5 to S9 in the flowchart illustrated in FIG. 7, the detailed description is omitted.

Figure 21:
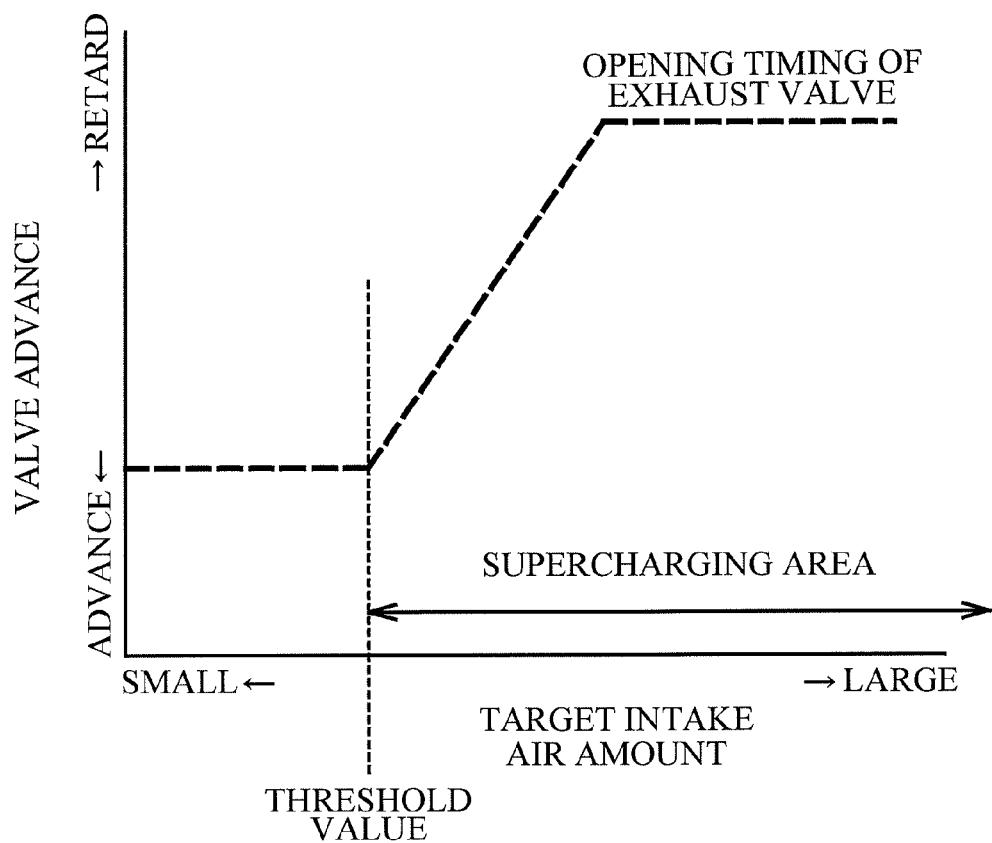
FIG. 21 illustrates an example of a map for deciding the opening timing of the exhaust valve with respect to the target intake air amount.

When the result of the determination of step S24 is YES, the process proceeds to step S30. In step S30, an exhaust-valve phase difference retard correction value is calculated. The exhaust-valve phase difference retard correction value is calculated based on an example of a map illustrated in FIG. 21. Specifically, in the supercharging area, the opening timing of the exhaust valve 9 is retarded as the target intake air amount becomes large, and the opening timing of the exhaust valve is returned to the advance side as the target intake air amount becomes small. This purpose is described hereinafter. When the exhaust turbocharger 15 is in the supercharging state, there are a large amount of air in the cylinders and it is easy to maintain the supercharging response. Therefore, the expansion ratio is raised by opening the exhaust valve 9 late, and the fuel consumption is improved. On the other hand, when the target intake air amount becomes small regardless of the supercharging state, it is considered that the exhaust energy becomes small. Therefore, the opening timing of the exhaust valve 9 is controlled to the advance side to maintain the supercharging response.

After the process of step S30 is performed, the processes of steps S31 to S35 are performed as is the case with the processes of steps S25 to S29. Here, in the calculation of the exhaust-valve phase difference advance target value in step S32, the correction value calculated in step S30 is taken into consideration.

Figure 22:
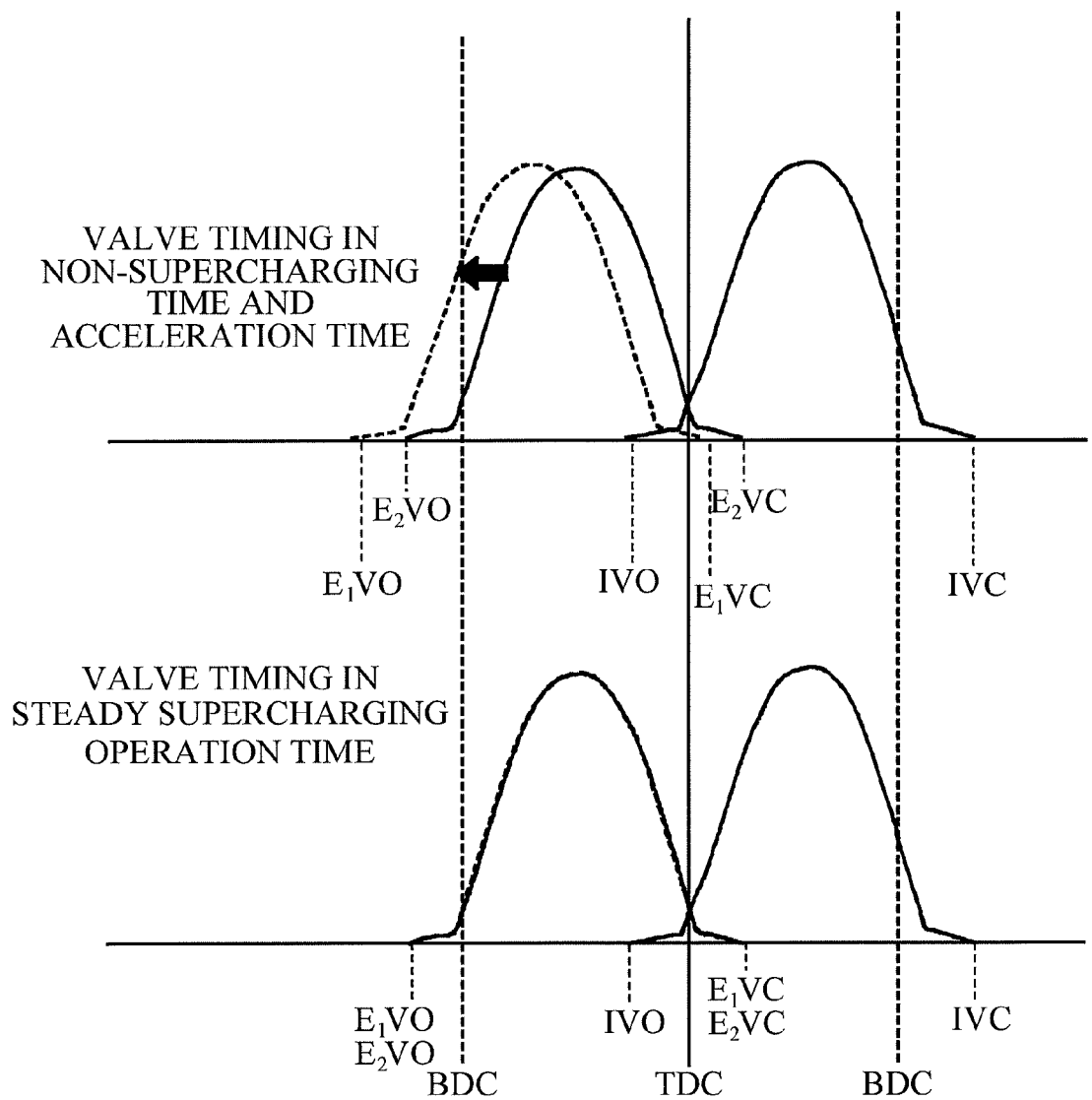
FIG. 22 is a graph illustrating an example of valve timing in acceleration time.
Figure 23:
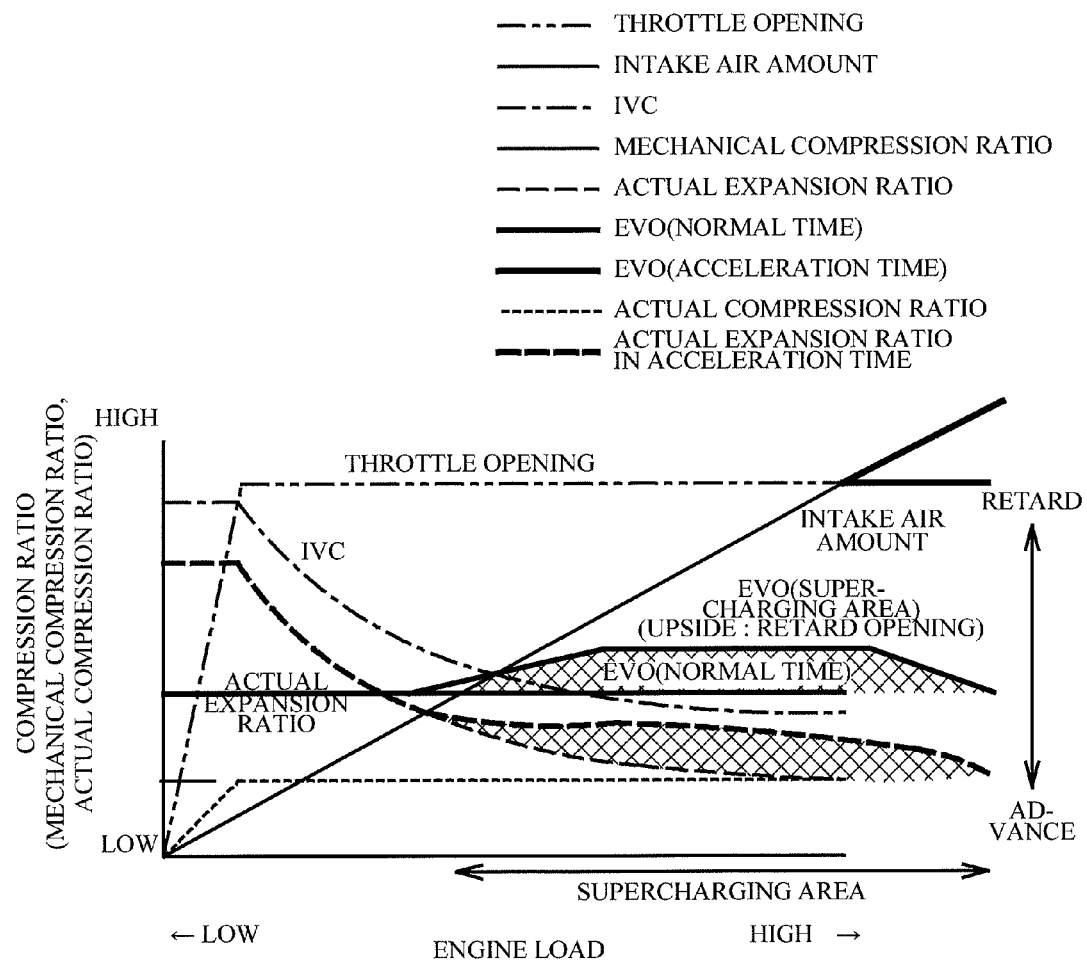
FIG. 23 is an explanatory diagram illustrating an example of the change of various parameters of the engine according to the embodiment.

A description will be given of the features of the engine 100 in which an example of the control is described above, with reference to FIGS. 22 and 23. FIG. 22 is a graph illustrating an example of valve timing in steady supercharging operation time as compared with valve timing in the non-supercharging time and the acceleration time. FIG. 23 is an explanatory diagram illustrating an example of the change of various parameters of the engine 100 according to the embodiment.

According to FIG. 17, in the non-supercharging time and the acceleration time, the opening timing $E_1VO$ is advanced relative to the opening timing $E_2VO$. On the contrary, in the steady supercharging operation time, the opening timing $E_1VO$ is retarded and is the same timing as the opening timing $E_2VO$.

A description will be given, with reference to FIG. 23, of the change of various parameters of the engine 100 according to the embodiment, which is controlled according to the above-mentioned valve timing. According to FIG. 23, the throttle opening is maintained at the full throttle when the engine load is equal to or more than a given engine load. The intake air amount becomes large with increase of the engine load. The IVC, i.e., the closing timing of the intake valve 7 shifts to an advance side as the engine load turns into the high load. That is, as the engine load turns into the low load, the closing timing of the intake valve 7 shifts to a retard side and is controlled to be late. The mechanical compression ratio becomes low as the engine load turns into the high load. That is, as the engine load turns into the high load, the mechanical compression ratio is controlled to become low so that the actual compression ratio becomes constant. The EVO in normal time, i.e., the opening timing of the exhaust valve 9 is constant. On the contrary, in the steady supercharging time, the opening timing of the exhaust valve 9 is controlled to a retard side. Thus, with the late opening of the exhaust valve 9, the expansion ratio becomes large.

Thus, when the engine is operated with a load equal to or more than the middle load, and is in the steady supercharging operation state in which the supercharging is performed by the exhaust turbocharger, the actual expansion ratio is set greatly, so that the fuel consumption is improved.

Above described embodiments are exemplary embodiments carrying out the present invention. Therefore, the present invention is not limited to those, and various modification and change could be made hereto without departing from the spirit and scope of the claimed present invention.

DESCRIPTION OF LETTERS OR NUMERALS

1 . . . crankcase
2 . . . cylinder block
3 . . . cylinder head
4 . . . piston
5 . . . combustion chamber
7 . . . intake valve
9 . . . exhaust valve
A . . . variable compression ratio mechanism
B . . . variable intake valve timing mechanism C ... variable exhaust valve timing mechanism
15 ... exhaust turbocharger

The invention claimed is:

1. A high expansion ratio engine equipped with a supercharger which is rotationally driven by means of exhaust gas and in which an expansion ratio is settable greater than a compression ratio, the engine comprising:
   an operation state determination unit that determines an operation state of the engine;
   a plurality of exhaust valves provided at a single cylinder;
   a variable exhaust valve timing mechanism that is capable of changing opening timing of at least one exhaust valve among the exhaust valves; and
   a controller that, when it is determined by the operation state determination unit that the engine is operated with a load equal to or more than a middle load and is in a steady supercharging operation state in which supercharging is performed by the supercharger, transmits a command to the variable exhaust valve timing mechanism and retards the opening timing of the at least one exhaust valve relative to the opening timing of another exhaust valve, compared with non-supercharging time of the supercharger.

2. The engine according to claim 1, further comprising:
   a variable compression ratio mechanism capable of changing a mechanical compression ratio; and
   a variable intake valve timing mechanism capable of changing closing timing of an intake valve;
   wherein the controller controls an actual compression ratio with the use of the variable compression ratio mechanism and the variable intake valve timing mechanism.

3. The engine according to claim 1, further comprising an intake air amount acquiring unit that acquires an intake air amount to a cylinder, wherein the controller controls an advance amount of the opening timing of the at least one exhaust valve so that the smaller the intake air amount, the larger the advance amount of the opening timing of the at least one exhaust valve.

4. An engine equipped with a supercharger which is rotationally driven by means of exhaust gas and in which an expansion ratio is settable greater than a compression ratio, the engine comprising:
   an operation state determination unit that determines an operation state of the engine;
   a plurality of exhaust valves provided at a single cylinder;
   a variable exhaust valve timing mechanism that is capable of changing opening timing of at least one exhaust valve among the exhaust valves; and
   a controller that, when it is determined by the operation state determination unit that the engine is operated with low load and is acceleration time, transmits a command to the variable exhaust valve timing mechanism and advances the opening timing of the at least one exhaust valve relative to the opening timing of another exhaust valve;
   wherein the controller controls an advance amount of the opening timing of the at least one exhaust valve so that the smaller the expansion ratio, the smaller the advance amount of the opening timing of the at least one exhaust valve.

5. The engine according to claim 4, further comprising:
   a variable compression ratio mechanism capable of changing a mechanical compression ratio; and
   a variable intake valve timing mechanism capable of changing closing timing of an intake valve;
   wherein the controller controls an actual compression ratio with the use of the variable compression ratio mechanism and the variable intake valve timing mechanism.

6. The engine according to claim 5, wherein when it is determined by the operation state determination unit that the engine is the acceleration time in a state where the closing timing of the intake valve has been changed into a side in which the compression ratio is reduced, with the variable intake valve timing mechanism, the controller changes the closing timing of the intake valve in a direction in which the compression ratio is improved, with the variable intake valve timing mechanism.

7. The engine according to claim 6, wherein when it is determined by the operation state determination unit that acceleration request of the engine has reduced in a state where the closing timing of the intake valve has been changed into a side in which the compression ratio is reduced, with the variable intake valve timing mechanism, the controller changes the closing timing of the intake valve in a direction in which the compression ratio is reduced, with the variable intake valve timing mechanism.

8. The engine according to claim 4, wherein the controller controls an advance amount of the opening timing of the at least one exhaust valve so that the smaller a target intake air amount, the larger the advance amount of the opening timing of the at least one exhaust valve.

9. An engine equipped with a supercharger which is rotationally driven by means of exhaust gas and in which an expansion ratio is settable greater than a compression ratio, the engine comprising:
   an operation state determination unit that determines an operation state of the engine;
   a plurality of exhaust valves provided at a single cylinder;
   a variable exhaust valve timing mechanism that is capable of changing opening timing of at least one exhaust valve among the exhaust valves; and
   a controller that, when it is determined by the operation state determination unit that the engine is operated with low load and is acceleration time, transmits a command to the variable exhaust value timing mechanism and advances the opening timing of the at least one exhaust valve relative to the opening timing of another exhaust valve;
   wherein when it is determined by the operation state determination unit that acceleration request of the engine has reduced, the controller retards the opening timing of the at least one exhaust valve in which the opening timing has been advanced.

* * * * *